United States Patent
Gauthier et al.

(10) Patent No.: US 10,628,775 B2
(45) Date of Patent: *Apr. 21, 2020

(54) SANKEY DIAGRAM GRAPHICAL USER INTERFACE CUSTOMIZATION

(71) Applicant: SAP SE, Walldorf (DE)

(72) Inventors: Alain Gauthier, Montreal (CA); Mohannad El-Jayousi, L'lle-Bizard (CA); Farid Toubal-Seghir, Laval (CA); Roy Ghorayeb, Montreal (CA); Ghufran Iftikhar, Vaudreuil-Dorion (CA); James Zdralek, Montreal (CA); Rischa Poncik, Dorval (CA); Wanling Zhang, Montreal (CA)

(73) Assignee: SAP SE, Walldorf (DE)

( * ) Notice: Subject to any disclaimer, the term of this patent is extended or adjusted under 35 U.S.C. 154(b) by 934 days.

This patent is subject to a terminal disclaimer.

(21) Appl. No.: 14/821,332

(22) Filed: Aug. 7, 2015

(65) Prior Publication Data

US 2017/0039233 A1 Feb. 9, 2017

(51) Int. Cl.
*G06Q 10/00* (2012.01)
*G06Q 10/06* (2012.01)
(Continued)

(52) U.S. Cl.
CPC ......... *G06Q 10/067* (2013.01); *G06F 3/0482* (2013.01); *G06F 3/0484* (2013.01);
(Continued)

(58) Field of Classification Search
CPC combination set(s) only.
See application file for complete search history.

(56) References Cited

U.S. PATENT DOCUMENTS

| 8,650,492 B1 * | 2/2014 | Mui ..................... H04L 43/045 715/736 |
| 9,021,361 B1 * | 4/2015 | Pettinati ................. G06F 3/048 715/736 |

(Continued)

*Primary Examiner* — William S Brockington, III
*Assistant Examiner* — Scott M Ross
(74) *Attorney, Agent, or Firm* — Jones Day

(57) ABSTRACT

A system, method, and computer program product for selecting, processing, and visually depicting information in real time using in-memory technology and user-customizable Sankey diagrams in a graphical user interface. Embodiments receive data describing contact interactions with a business establishment, select interactions occurring frequently during a given time span that led to selected target events, and aggregate similar interaction sequences into paths displayed with widths denoting relative flow quantities. Embodiments modify the depicted information according to user customization of the Sankey diagram. Coherent coordination of visual depiction by context, associated algorithms and models, data sources, event types, and various graphical indicia helps provide an intuitive exploratory situational overview and enables user-driven detailed investigations of complex data via manipulations of the Sankey diagrams. Business assessments and properly directed business actions may improve marketing campaign and customer service effectiveness and increase return on investment without requiring extensive user training or database expertise.

24 Claims, 45 Drawing Sheets

(51) Int. Cl.
*G06T 11/20* (2006.01)
*G06F 3/0484* (2013.01)
*G06Q 30/02* (2012.01)
*G06F 16/26* (2019.01)
*G06F 3/0482* (2013.01)

(52) U.S. Cl.
CPC ............ *G06F 16/26* (2019.01); *G06Q 10/063* (2013.01); *G06Q 30/0251* (2013.01); *G06T 11/206* (2013.01); *G06T 2200/24* (2013.01)

(56) References Cited

U.S. PATENT DOCUMENTS

| | | | | |
|---|---|---|---|---|
| 2015/0081701 | A1* | 3/2015 | Lerios | H04L 43/045 |
| | | | | 707/736 |
| 2016/0063072 | A1* | 3/2016 | N | G06F 16/248 |
| | | | | 707/722 |
| 2016/0357402 | A1* | 12/2016 | Matas | G06T 11/60 |
| 2017/0098318 | A1* | 4/2017 | Iannaccone | G06F 3/0485 |

* cited by examiner

FIG. 5

| CONTACT KEY | INTERACTION TYPE | COMMUNICATION MEDIUM | ASSIGNED CHANNEL | TIME STAMP |
|---|---|---|---|---|
| E1EE495BE3EBD4905AD37 | SOCIAL_POSTING | FACEBOOK | SOCIAL | 3/23/2015 |
| E1EE495BE3EBD4906F589 | SHOP_CHECKOUT_SUCCESS | ONLINE_SHOP | COMMERCE | 4/25/2015 |
| E1EE495BE3EBD49803070 | SOCIAL_POSTING | TWITTER | SOCIAL | 6/23/2015 |
| E1EE495BE3EBD4981DE05 | TELEPHONE_INBOUND | PHONE | PHONE | 11/16/2015 |
| E1EE495BE3EBD500A8035 | SOCIAL_POSTING | FACEBOOK | SOCIAL | 12/13/2015 |
| E1EE495BE3EBD499077F3 | SMS_OUTBOUND | PHONE | PHONE | 7/6/2015 |
| E1EE495BE3EBD49958FF3 | WEBSITE_VISIT | WEB | WEB | 10/14/2015 |
| E1EE495BE3EBD4905F433 | SHOP_ITEM_ADD | ONLINE_SHOP | COMMERCE | 4/25/2015 |
| E1EE495BE3EBD4901EFC | EMAIL_OPENED | EMAIL | EMAIL | 1/2/2015 |
| E1EE495BE3EBD4906E900 | CLICK_THROUGH | WEB | WEB | 5/15/2015 |

```
⊖SELECT
    IA_CNT_SUM,
    IC_CNT_SUM,
    JOURNEY_PATH,
    RANK_PERC
FROM (SELECT
    JOURNEY_PATH,
    SUM(IA_CNT) AS IA_CNT_SUM,
    count( distinct contact_key) as IC_CNT_SUM,
    PERCENT_RANK() OVER (
        ORDER BY SUM(IA_CNT) DESC) * 100 AS RANK_PERC
    FROM "_SYS_BIC"."sap.hana-app.cuan.contact.internal/CA_CJI_PATH"
    GROUP BY JOURNEY_PATH)
WHERE (RANK_PERC <= '100')
GROUP BY IA_CNT_SUM,
    IC_CNT_SUM,
    JOURNEY_PATH,
    RANK_PERC
ORDER BY IA_CNT_SUM desc LIMIT 10000 WITH PARAMETERS ('placeholder' = ('$$Iv_to$$',
    '20141230133427.0000000') ,
    'placeholder' = ('$$Iv_from$$',
    '20141101230000.0000000') ,
    'placeholder' = ('$$Iv_depth$$',
    '5'),
    'LOCALE'='CASE_INSENSITIVE')
```

|   | IA_CNT_SUM | IC_CNT_SUM | JOURNEY_PATH | RANK_PERC |
|---|---|---|---|---|
| 1 | 2,810 | 2,810 | COMMERCE,WEB,SOCIAL,WEB,COMMERCE | 0 |
| 2 | 2,485 | 2,485 | COMMERCE,SOCIAL,PHONE,COMMERCE,WEB | 0.30959752321981426 |
| 3 | 2,437 | 2,437 | PHONE,SOCIAL,WEB,SOCIAL,COMMERCE | 0.619195046439628S |
| 4 | 2,145 | 2,145 | PHONE,SURVEY,EVENT,EMAIL,COMMERCE | 0.9287925696594427 |
| 5 | 2,012 | 2,012 | PHONE,EMAIL,EVENT,EMAIL,COMMERCE | 1.23839009287925 |
| 6 | 1,801 | 1,801 | PHONE,EMAIL,EVENT,SURVEY,COMMERCE | 1.547987616090713 |
| 7 | 1,145 | 1,145 | COMMERCE,EVENT,PHONE,EVENT,COMME... | 1.857585139318885 |

FIG. 9

```
SELECT JOURNEY_PATH, SUM(IA_CNT) AS IA_CNT_SUM
FROM "_SYS_BIC"."sap.hana-app.cuan.contact.internal/CA_CI_PATH" (
  'placeholder' = ('$$iv_depth$$','5'),
  'placeholder' = ('$$iv_from$$','2014-01-01'),
  'placeholder' = ('$$iv_to$$','2014-12-31'))
WHERE ( COUNTRY = 'ES' OR COUNTRY = 'DE' )
GROUP BY JOURNEY_PATH
ORDER BY IA_CNT_SUM desc
```

900

| JOURNEY_PATH | IA_CNT_SUM |
|---|---|
| COMMERCE | 1,183 |
| COMMERCE,EMAIL | 621 |
| COMMERCE,WEB | 275 |
| COMMERCE,PHONE | 122 |
| COMMERCE,WEB,EMAIL | 105 |
| COMMERCE,EMAIL,COMMERCE | 97 |
| COMMERCE,EMAIL,WEB | 96 |
| COMMERCE,EVENT | 85 |
| COMMERCE,PHONE,EMAIL | 48 |
| COMMERCE,WEB,COMMERCE | 46 |

FIG. 11

```
SELECT CONTACT_KEY AS CONTACT
FROM "SYS_BIC"."app.hana.aip.own.contact.internal/CA_CTX_PATH" (
    placeholder."$$IV_depthIS$" => ( 3 ),
    placeholder."$$IV_fromIS$" => ( '2014-01-01' ),
    placeholder."$$IV_toIS$" => ( '2014-12-31' ) )
WHERE ( COUNTRY = 'US' OR COUNTRY = 'DE' ) AND
    ( JOURNEY_PATH = 'COMMERCE,EVENT,COMMERCE' OR JOURNEY_PATH = 'COMMERCE,EVENT,USD' )
GROUP BY CONTACT_KEY
```

| CONTACT |
|---|
| 5CF3FC0B4C081E6985E85E04D56A037 |
| 5CF3FC0B4C081E6985E85E04D26A037 |
| 5CF3FC0B4C081E6985E85E04D289637 |
| 5CF3FC0B4C081E6985E85E04D204037 |
| 5CF3FC0B4C081E6985E85E04D25AA037 |
| 5CF3FC0B4C081E6985E85E04D254037 |
| 5CF3FC0B4C081E6985E85E04F279A037 |
| 5CF3FC0B4C081E6985E85E04F282037 |
| 5CF3FC0B4C081E6985E85E04F448037 |
| 5CF3FC0B4C081E6985E85E04F481037 |

```
SELECT CONTACT_KEY AS CONTACT
FROM "_SYS_BIC"."sap.hana-app.cuan.contact.internal/CA_CI_PATH" (
  'placeholder' = ('$$iv_depth$$', '3'),
  'placeholder' = ('$$iv_from$$', '2014-01-01'),
  'placeholder' = ('$$iv_to$$', '2014-12-31') )
WHERE ( COUNTRY = 'ES' OR COUNTRY = 'DE' )
GROUP BY CONTACT_KEY
```

1300

| CONTACT |
|---|
| 40F2E930666C1ED4AA9002DB050D758A |
| 40F2E930666C1EE4A780BD8928347848 |
| 40F2E930666C1EE4A780BD8928351848 |
| 40F2E930666C1EE4A780BD8928355848 |
| 5CF3FCDB4C0E1EE495BE3EBD48FEED37 |
| 5CF3FCDB4C0E1EE495BE3EBD48FF6D37 |
| 5CF3FCDB4C0E1EE495BE3EBD48FFCD37 |
| 5CF3FCDB4C0E1EE495BE3EBD4900AD37 |
| 5CF3FCDB4C0E1EE495BE3EBD490016D37 |
| 5CF3FCDB4C0E1EE495BE3EBD490018D37 |

FIG. 15

```
SELECT CONTACT_KEY AS CONTACT
FROM "_SYS_BIC"."sap.hana-app.cuan.contact.internal/CA_COI_PATH" (
 'placeholder' = ('$$iv_depth$$','3'),
 'placeholder' = ('$$iv_from$$','2014-01-01'),
 'placeholder' = ('$$iv_to$$','2014-12-31'))
WHERE ( COUNTRY = 'ES' OR COUNTRY = 'DE' ) AND JOURNEY_PATH = 'COMMERCE'
GROUP BY CONTACT_KEY
```

1500

| CONTACT |
|---|
| 40F2E930666C1E04AA9002DB050D738A |
| 40F2E930666C1E4A780BD892835S84B |
| 5CF3FCDB4C0E1EE495BE8BD48FEED... |
| 5CF3FCDB4C0E1EE495BE8BD490180... |
| 5CF3FCDB4C0E1EE495BE8BD4903A... |
| 5CF3FCDB4C0E1EE495BE8BD490800... |
| 5CF3FCDB4C0E1EE495BE8BD490086D... |
| 5CF3FCDB4C0E1EE495BE8BD4908C... |
| 5CF3FCDB4C0E1EE495BE8BD490C8... |
| 5CF3FCDB4C0E1EE495BE3E8D4910C... |

FIG. 23

| CONTEXT | QUANTITY | PATTERN | |
|---|---|---|---|
| MARKETING | 1...5 |  | #BCC300 |
| MARKETING | 6...10 |  | #B8C600 |
| MARKETING | 11...15 |  | #B8C512 |
| HUMIDITY | 0...50 |  | |
| HUMIDITY | 51...75 |  | |
| HUMIDITY | 76...100 |  | |
| CLAIM | 1...20 |  | |
| CLAIM | 21...30 |  | |
| CLAIM | 31...40 |  | |

FIG. 32

| CONTEXT | SCENARIO | DATA SOURCE | MODEL / ALGORITHM |
|---|---|---|---|
| SALES | REVENUE VS. WEB NAVIGATION PATHS | SERVER 1 | GILG_02 – BUYING PROPENSITY |
| LOYALTY | CUSTOMERS THAT CHURN | SERVER 1 + 2 | C-SPADE |
| CUSTOMER JOURNEY | BUY | SERVER 3 | AGGREGATED TIME BASED INTERACTIONS LEADING TO SALES |
| ... | | | |

FIG. 40

| BUSINESS CONTEXT | USER ACTION | TYPE OF CHART | DATA | POSITION |
|---|---|---|---|---|
| MARKETING | LOAD SANKEY DIAGRAM | LINE | SENTIMENT | TOP |
| MARKETING | LOAD SANKEY DIAGRAM | HORIZONTAL BAR | USER AGES | TOP |
| MARKETING | LOAD SANKEY DIAGRAM | CLOUD | INTEREST | TOP |
| MARKETING | LOAD SANKEY DIAGRAM | PIE CHART | GENDER | TOP |
| MARKETING | LOAD SANKEY DIAGRAM | DELOCALIZATION | MAP | TOP |
| MARKETING | CLICK NODE/PATH | LINE | SENTIMENT | DIALOG |
| MARKETING | CLICK NODE/PATH | HORIZONTAL BAR | USER AGES | DIALOG |
| MARKETING | CLICK NODE/PATH | CLOUD | INTEREST | DIALOG |
| MARKETING | CLICK NODE/PATH | PIE CHART | GENDER | DIALOG |
| MARKETING | CLICK NODE/PATH | DELOCALIZATION | MAP | DIALOG |

SANKEY DIAGRAM GRAPHICAL USER INTERFACE CUSTOMIZATION

CROSS-REFERENCE TO RELATED APPLICATIONS

This application is related to other concurrently-filed and commonly-assigned applications, including attorney docket numbers:

U.S. patent application Ser. No. 14/821,476, entitled "Generating Metadata And Visuals Related To Mined Data Habits".

U.S. patent application Ser. No. 14/821,465, entitled "Rendering Details From User Selections Of Mined Data Habits".

U.S. patent application Ser. No. 14/821,437, entitled "Building Business Objects Based on Sankey Diagram".

U.S. patent application Ser. No. 14/821,446, entitled "Simplification Of Sankey Diagram".

Each of these related applications is hereby incorporated herein by reference in its entirety.

BACKGROUND

The embodiments of the present invention relate to graphical user interfaces and in-memory databases for intuitive management of complex information, and in particular to customizing Sankey diagrams depicted in graphical user interfaces. A Sankey diagram is a specific type of flow diagram in which the depicted width of each path is typically proportional to the flow quantity through that path. Such depictions may rapidly communicate flow information in a wide variety of scenarios, enabling a rapid clear overview of a process.

Originally created to visually describe the flow of energy through a steam engine, Sankey diagrams are now also used to describe information, material, and cost flows in a business enterprise for example. As enterprise resource management increases in complexity, Sankey diagrams are becoming increasingly important tools for helping users intuitively understand the dynamics of various business activities. Further, Sankey diagrams may be dynamically updated to show not only historical but also current operational information.

Users of modern enterprise resource management tools may expect evaluation and depiction of possibly very complex and ever-changing business data and interrelationships in essentially real time in many cases. The fastest available databases thus may be needed to select, process, and display the relevant information in a manner that appears essentially continuous to a user. In-memory databases that primarily operate on data stored in a computer system's main memory tend to be faster than older databases that required significant external secondary storage input/output operations. In-memory databases may also perform data operations other than calculations (i.e., comparisons, transfers, etc.) much faster than they perform calculations.

In-memory databases may thus span both the traditional transactional queries that were historically performed only periodically for reporting purposes, and analytical queries that may require the immediate availability of operational data to enable accurate business insights and real time decision making. An in-memory database may be of particular and even critical utility for the rapid data processing and updating of Sankey diagram depictions. An example of an in-memory database is the SAP® High Performance Analytics Appliance (HANA®) database.

Business tool users may wish to customize Sankey diagrams to select and depict information from high-volume high-speed data describing business operations in particular ways. For example, users in finance, customer service, and marketing groups may each have their own ideas about which information is particularly useful for their needs. Accordingly, the inventors have developed improvements for the customization of graphical user interfaces for Sankey diagrams using in-memory technology.

BRIEF DESCRIPTION OF THE DRAWINGS

FIG. 5 is a contact interaction data table, according to an exemplary embodiment.

FIG. 8 is a diagram of a Structured Query Language (SQL) query for finding paths, according to an exemplary embodiment.

FIG. 9 is a diagram of a SQL query for finding paths with constraints, according to an exemplary embodiment.

FIG. 11 is a diagram of a SQL query related to the FIG. 10 Sankey diagram, according to an exemplary embodiment.

FIG. 13 is a diagram of a SQL query related to the FIG. 12 Sankey diagram, according to an exemplary embodiment.

FIG. 15 is a diagram of a SQL query related to the FIG. 14 Sankey diagram, according to an exemplary embodiment.

FIG. 23 is a table for defining path quantity depiction representations, according to an exemplary embodiment.

FIG. 32 is a table of scenario mapping settings, according to an exemplary embodiment.

FIG. 40 is a table of customization settings, according to an exemplary embodiment.

DETAILED DESCRIPTION

As described more fully below, the system, method, and computer program product embodiments disclosed may permit improved data selection, processing, and information display via customized Sankey diagrams depicted in a graphical user interface, using in-memory technology. This description presents an exemplary and non-limiting use scenario in which a marketing analyst of a business enterprise may customize the Sankey diagrams generated by an enterprise resource management tool. However, many other users may also customize Sankey diagrams according to their own needs using the systems, methods, and computer program products described.

Figure 1:
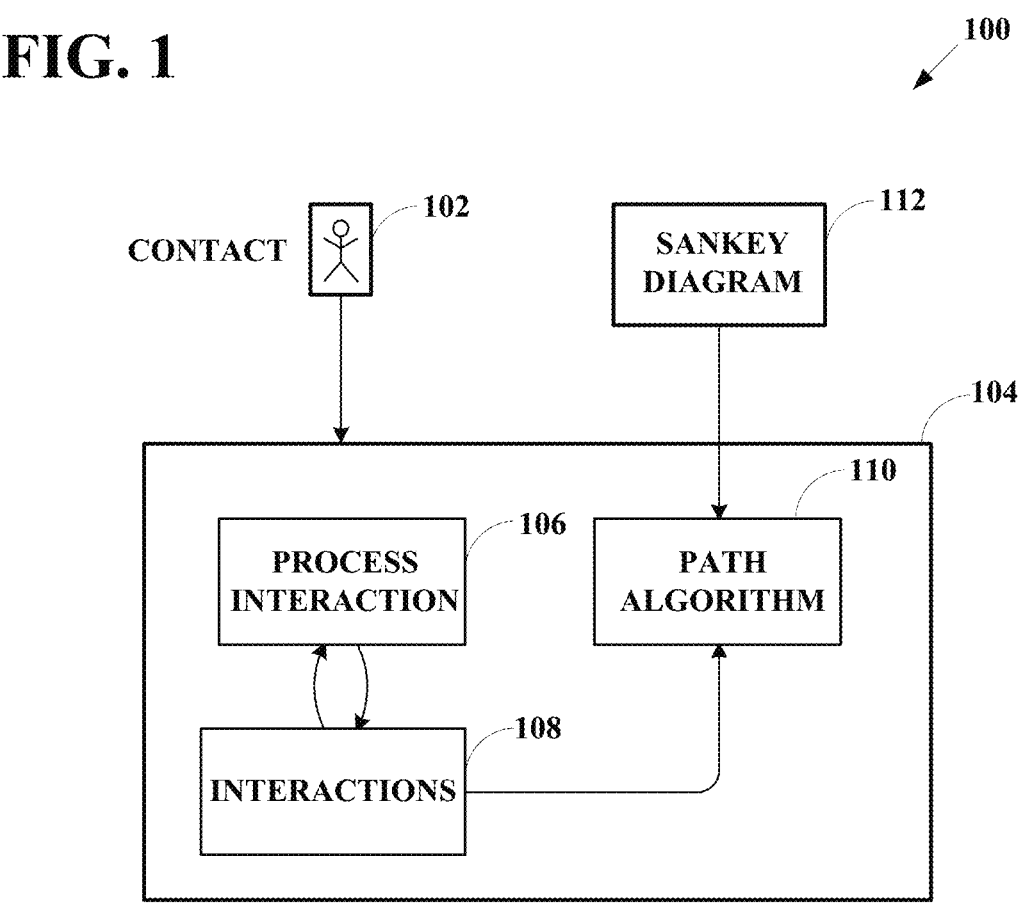
FIG. 1 is a diagram of a contact interaction processing system, according to an exemplary embodiment.

Referring now to FIG. 1, a diagram 100 is shown of a contact interaction processing system, according to an embodiment. A contact 102 may comprise a customer or potential customer who may interact with a business establishment, directly or indirectly, in some way. The contact 102 may also comprise any other person or business that may interact with the business establishment. In the use scenario presented here, the contact 102 may comprise a person who is shopping for goods or services through various communications media. The media may comprise for example telephone calls, emails, and visits to internet/web sites including but not limited to vendor web sites, reviewer web sites, electronic commerce web sites, and social media web sites. Generally, any form of interaction by the contact 102 that may be identified and tracked by a business establishment may be encompassed within the scope of the embodiments of the present invention.

The contact interaction processing system 104 may be part of a marketing program and/or part of a broader enterprise resource management program that tracks customer experiences. Further, the contact interaction processing system 104 may also handle interactions from any outside source, including but not limited to user interactions, batch jobs, and real time interaction replication from external systems.

The contact interaction processing system 104 may identify and track direct and indirect interactions by the contact 102 or others, and process the interactions or experiences in substantially real time, to produce a stored body of interactions 108. The volume of interactions processed may be immense for a business establishment that has many contacts 102 that may each generate many interactions that may each involve multiple other parties. An in-memory database may therefore be necessary to handle the mass data volume at adequate speed, e.g., in practically real time.

A user of the contact information processing system, such as a marketing analyst, may wish to monitor and characterize all such historical and ongoing interactions, often without any preconceived notion of the type, volume, or dynamics of the interactions that are occurring. That is, the task of the exemplary marketing analyst may be to determine in a broad sense how contacts 102 are interacting with the business establishment, and perhaps to also develop anonymous contacts into high volume customers and even brand advocates. A typical user of the contact interaction processing system 104 may wish to explore the contact interactions or customer experiences and iteratively customize the data selected, processed, and displayed along the way. The stored body of interactions 108 may thus comprise all contact interactions, which may be kept updated and available for analysis and display.

In one embodiment, the contact interaction processing system 104 may selectively mine the stored body of interactions 108 to determine the particular interaction sequences that particular contacts 102 may be performing when interacting with a business establishment. Such sequential contact interaction patterns or "contact journeys" may for example describe the various interaction trajectories that eventually led to successful outcomes, such as customer purchase events. The exemplary marketing analyst may be very interested in recognizing and understanding such customer journeys, as well as those that did not lead to successful outcomes. More generally, a user may wish to visualize and analyze contact journey data that ends at an outcome meeting particular specified target criteria of interest. In this description, target criteria are described in plural for generality, but may comprise a single criterion (e.g., a purchase event).

A given contact 102 may for example begin interacting with a business enterprise at an entry point and then effectively "travel" toward an eventual outcome through various interaction channels, forming a navigational trajectory. Contacts 102 may interact via communications media such as telephone calls, emails, internet accesses, or via marketing events. Profile information for contacts 102 may be enriched by internal and external data sources, which may score their interactions.

The contact interaction processing system 104 may aggregate individual contact journeys for a population of contacts 102, to provide insight into frequently occurring contact interaction combinations. That is, similar trajectory groups or interaction paths followed by portions of a contact population may be recognized by counting the occurrence frequency of various sequential navigation patterns. Business establishments are often far more interested in the aggregate marketing behavior of populations than that of individuals, and often direct their marketing efforts according to group behavior. The embodiments therefore enable identification of contact population groups via their interaction paths or habitual behaviors.

The contact interaction processing system 104 may apply a path algorithm 110 to the stored body of interactions 108 to select data for a given interaction path. The selected data may be subsequently processed and made available for nearly immediate display in a Sankey diagram 112 depicted in a graphical user interface. The path algorithm 104 may be responsive to user customizations of the Sankey diagram, as will be described.

The contact interaction processing system 104 may update the Sankey diagrams in response to ongoing interactions that continue during diagram depiction. The path algorithm 104 may for example have access to the latest interaction information in the stored body of interactions 108, and may select new data for depiction while the user is currently observing the Sankey diagram for a given scenario. The contact interaction processing system 104 may thus adjust the displayed results with the latest "live" data, giving the marketing analyst the best overall dynamic experience to accomplish the task at hand.

Figure 2:
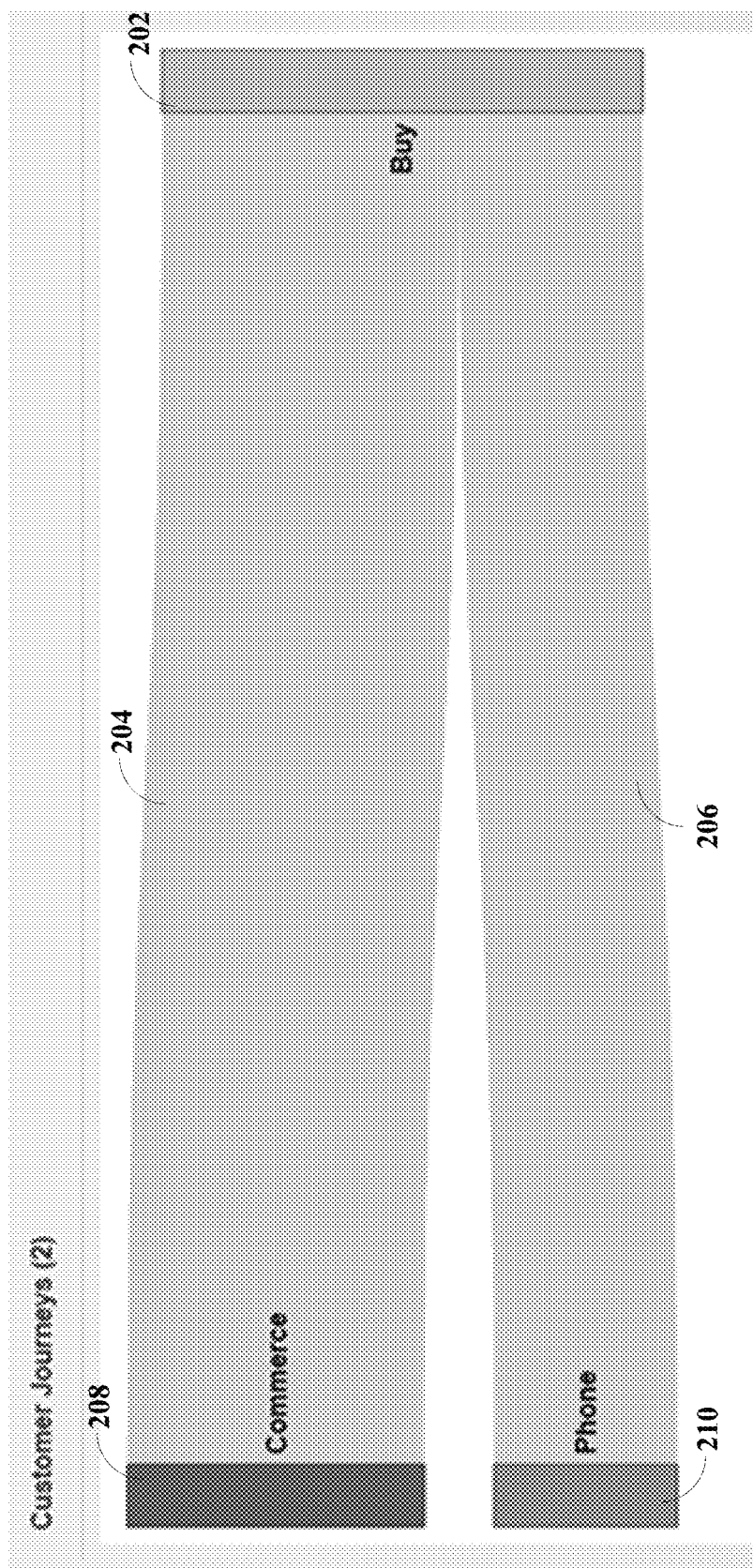
FIG. 2 is a Sankey diagram, according to an exemplary embodiment.

Referring now to FIG. 2, a Sankey diagram 200 is shown, according to an embodiment. The Sankey diagram may provide a visually depicted analysis of time-ordered contact behavior patterns over a selected time span. Interactions may be displayed as aggregated events or channel icons in a timeline chart relative to particular common navigational events, for contact journeys across the various utilized channels. Populations of contacts having a common navigational history may be recognized and distinguished, facilitating the creation of target contact groups.

In this scenario, two exemplary customer journey groups or paths 204 and 206 lead to a successful outcome of interest, e.g., a purchase 202. The first path 204 begins with a commerce event 208, while the second path 206 begins with a telephone event 210. Each path in this example leads to the purchase 202 without any intervening interactions for simplicity, though this is not necessarily typical. The contact population proceeding along the first path 204 is larger than the contact population proceeding along the second path 206. In the Sankey diagram 200 therefore the first path 204 is depicted as proportionally wider than the second path 206 to visually denote the relative flow in each path. A user may therefore immediately determine that the path beginning with the commerce event 208 is more successful in terms of contact volume leading to a purchase than the path beginning with the phone event 210.

Figure 3:
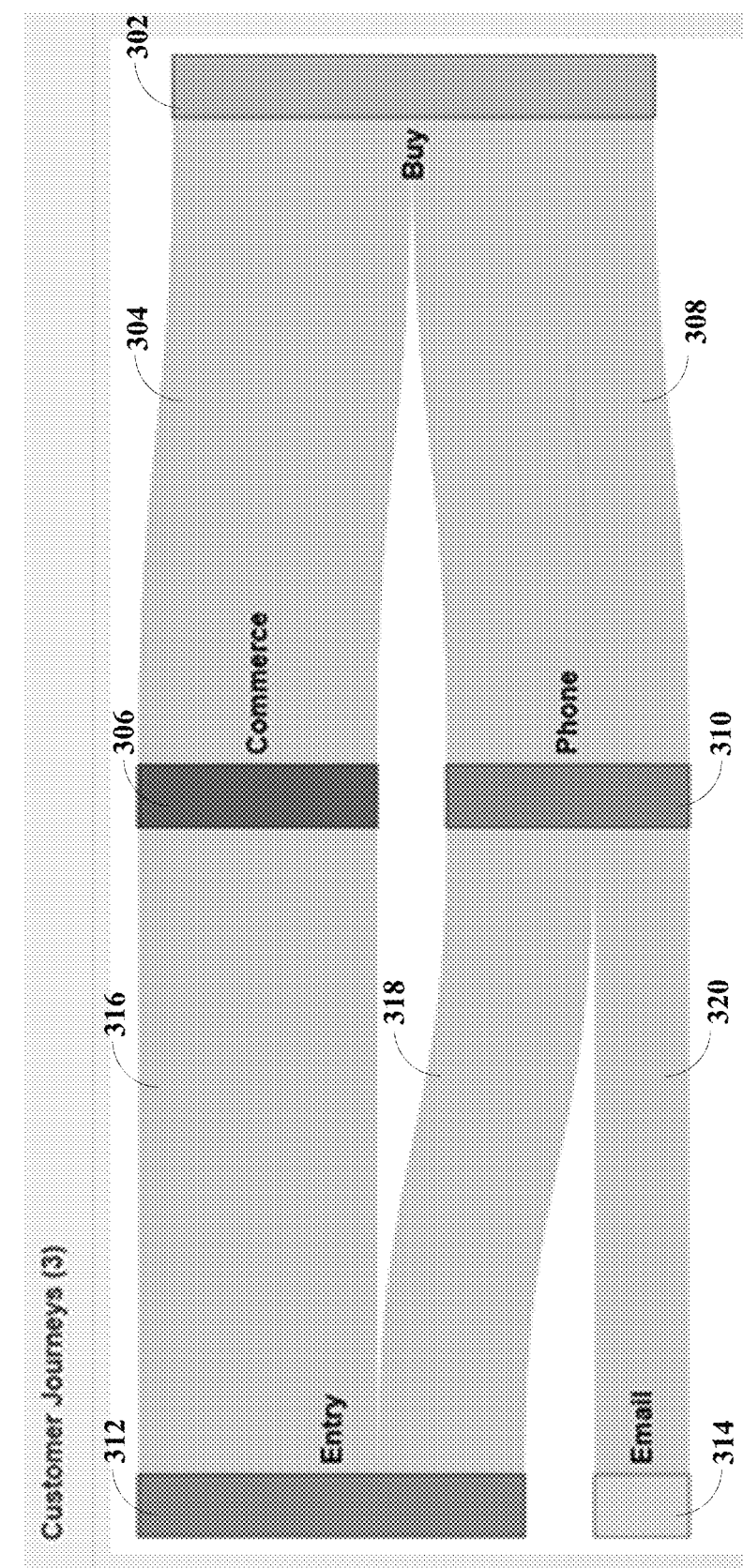
FIG. 3 is an updated Sankey diagram, according to an exemplary embodiment.

Referring now to FIG. 3, an updated Sankey diagram 300 is shown, according to an embodiment. This figure depicts the scenario of FIG. 2 some time (e.g., a few minutes) later, after which time the system has received new information and accordingly immediately updated its stored body of interactions. Current data now shows that the successful outcome of interest (e.g., purchase 302) is more evenly divided between a path 304 that is proceeding from a commerce event 306 and a path 308 that is proceeding from a phone event 310. A user may thus for example immediately discern that phone calls from contacts that are buying products are increasing.

However, the current data also shows that contact paths are actually originating at either an entry event 312 or an email event 314 and that contacts are proceeding along three separate paths thereafter. (The email event 314 may be a new business action performed by the business establishment to try to increase phone sales for example.)

Contacts may be proceeding from the entry event 312 to the commerce event 306 along a path 316 or may be proceeding to the phone event 310 along a path 318 instead. More contacts are following the path 316 than the path 318, so the Sankey diagram 300 depicts the path 316 as proportionally wider than the path 318. That is, the width of each path and its order in a displayed diagram may be determined by the percentage of the total flow it contains. The display order may also be modified by a user by for example selecting and dragging a particular path and/or node.

The data also shows that contacts are also proceeding from the email event 314 to the phone event 310 along a path 320. Fewer contacts are following the path 320 than the others, so it is shown as proportionally narrower. Note that in this case, the path algorithm 110 determined that depiction of a single layer of interaction was insufficient to convey adequate scenario information. Instead, a second layer of interaction that includes the new email event 314 was necessary to track the contact populations and was therefore added.

The embodiments described therefore enable a user to rapidly and intuitively determine relationships between paths and business actions. The updated Sankey diagram 300 may for example provide quantitative results of a marketing campaign (e.g., email event 314) that targets selected contacts with an email providing purchase incentives for making phone purchases. Although in this example rapidly updated historical data is shown in Sankey diagram 300, predictive data from marketing models or other models may also be depicted in similar fashion.

Figure 4:
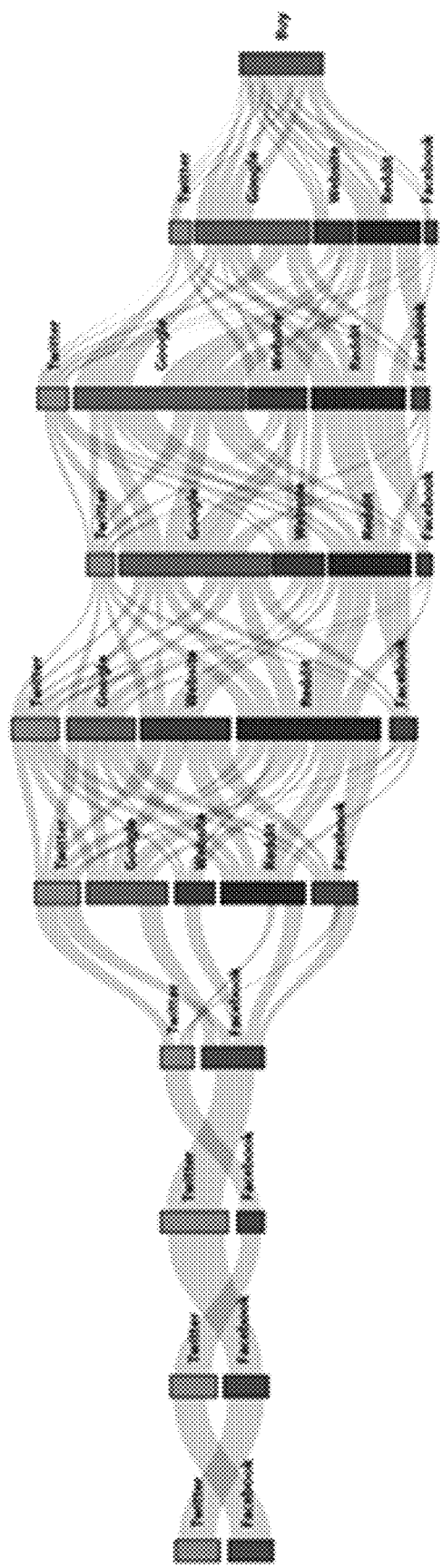
FIG. 4 is an extensive Sankey diagram, according to an exemplary embodiment.

Referring now to FIG. 4, an extensive Sankey diagram 400 is shown, according to an embodiment. In modern electronic commerce scenarios, there may be massive data on the numerous online customer interactions that eventually result in a target event, e.g., a purchase. When many contacts buy a product and the product provider wishes to see what marketing and communication channels the majority of buyers followed, the available data is often simply impenetrable with current tools. The mass of contact interaction data cannot be analyzed and visualized to provide informative dynamic insight into trends and contact group habits for use in business. No data mining solution exists that provides sequential pattern parsing for mass processing and coherent display of contact interactions, particularly in real time.

In this example, contacts may exchange opinions and share experiences via social media sites such as Facebook™, Reddit™, and Twitter™, many times. Contacts may also perform internet searches via search engines such as Google™ and at business establishment home pages, reviewer pages, etc. prior to a purchase. Embodiments described herein may process all of these interactions to produce the extensive Sankey diagram 400 in real time. The embodiments may thus systematically identify customer interests and create a complete orderly view of contacts in an interactive business ecosystem spanning a variety of channels.

Referring now to FIG. 5, a diagram 500 is shown of a contact interaction data table, according to an embodiment. Each contact interaction that occurs with a business establishment may be represented by an entry in the data table. Each interaction may be assigned a contact key (analogous to an identification number), and may be time stamped. Each interaction may also be characterized by an interaction type, communication medium, and an assigned channel.

The interaction type may be the most specific designation, which may describe the particular contact interaction in detail. Exemplary interaction types may comprise SOCIAL_POSTING, SMS_OUTBOUND, EMAIL_OPENED, WEBSITE_VISIT, CLICK_THROUGH, etc. corresponding to each precise interaction event that may be tracked. The communication medium designation may comprise PHONE, FACEBOOK, TWITTER, EMAIL, WEB, ONLINE_SHOP, etc. corresponding to the various available communication channels through which a tracked contact interaction occurred. The assigned channel may be broader than the communication medium designation, to summarize in more general terms the marketing channel to which a particular contact interaction may be grouped. Examples of assigned channels may comprise SOCIAL, SURVEY, COMMERCE, PHONE, WEB, and EMAIL. Sankey diagrams may thus typically depict the assigned channels involved in contact journeys.

Figure 6:
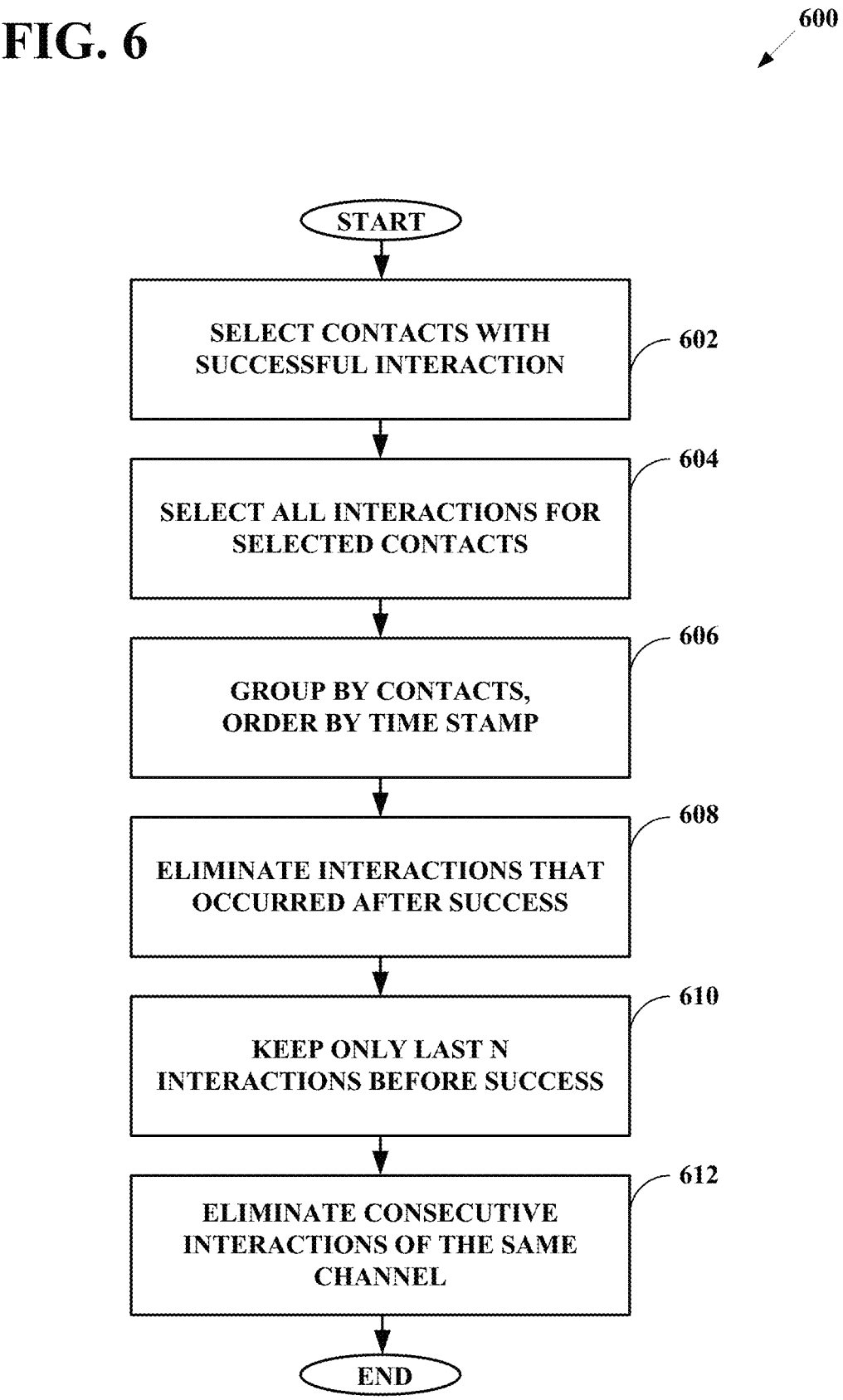
FIG. 6 is a diagram of an input data transformation method for constructing contact journeys, according to an exemplary embodiment.

Referring now to FIG. 6, a diagram 600 is shown of an input data transformation method for constructing contact journeys, according to an embodiment. At 602, an embodiment may select all contacts that experienced a successful interaction. More generally, the method may select all contacts that experienced an outcome that meets particular specified target criteria of interest. A date range of interest for the successful interaction may be specified, and the method may further select data accordingly. In many cases the target event of interest may refer to a purchase for example, but a user may also wish to explore many other possible contact interaction end results, such as a customer registration, an abandonment of an item that was placed into an online shopping cart, or a crash event requiring customer support. At 604, an embodiment may select all the interactions involving the selected contacts. In practical terms, this selection may identify all the individual steps taken along each successful customer's journey.

At 606, an embodiment may group the selected interactions by contact, and order by time stamp. Thus, the embodiment may assemble the particular contact interaction sequence or journey for each successful customer. At 608, an embodiment may eliminate interactions that occurred after the specified target criteria were met. At 610, an embodiment may keep only the last N interactions that occurred before the specified target criteria were met.

The parameter N may be considered to be a "level counter" maximum value that may be defaulted to a predetermined value, input by a user, determined by a path algorithm, or modified according to a user customization of a displayed Sankey diagram. The value of N may thus determine the "depth" of the journeys to be observed or explored by a user. The value of N may be adjusted to either limit data for an initial exploratory overview or to "drill down" further into the data, as needed to gain the best insight into the dynamics of a given scenario.

At 612, an embodiment may eliminate consecutive interactions of the same channel. For example, if a sequence of phone calls led to a purchase without other interactions via other channels, these separate calls may be condensed into a single representative step of a journey.

Figure 7:
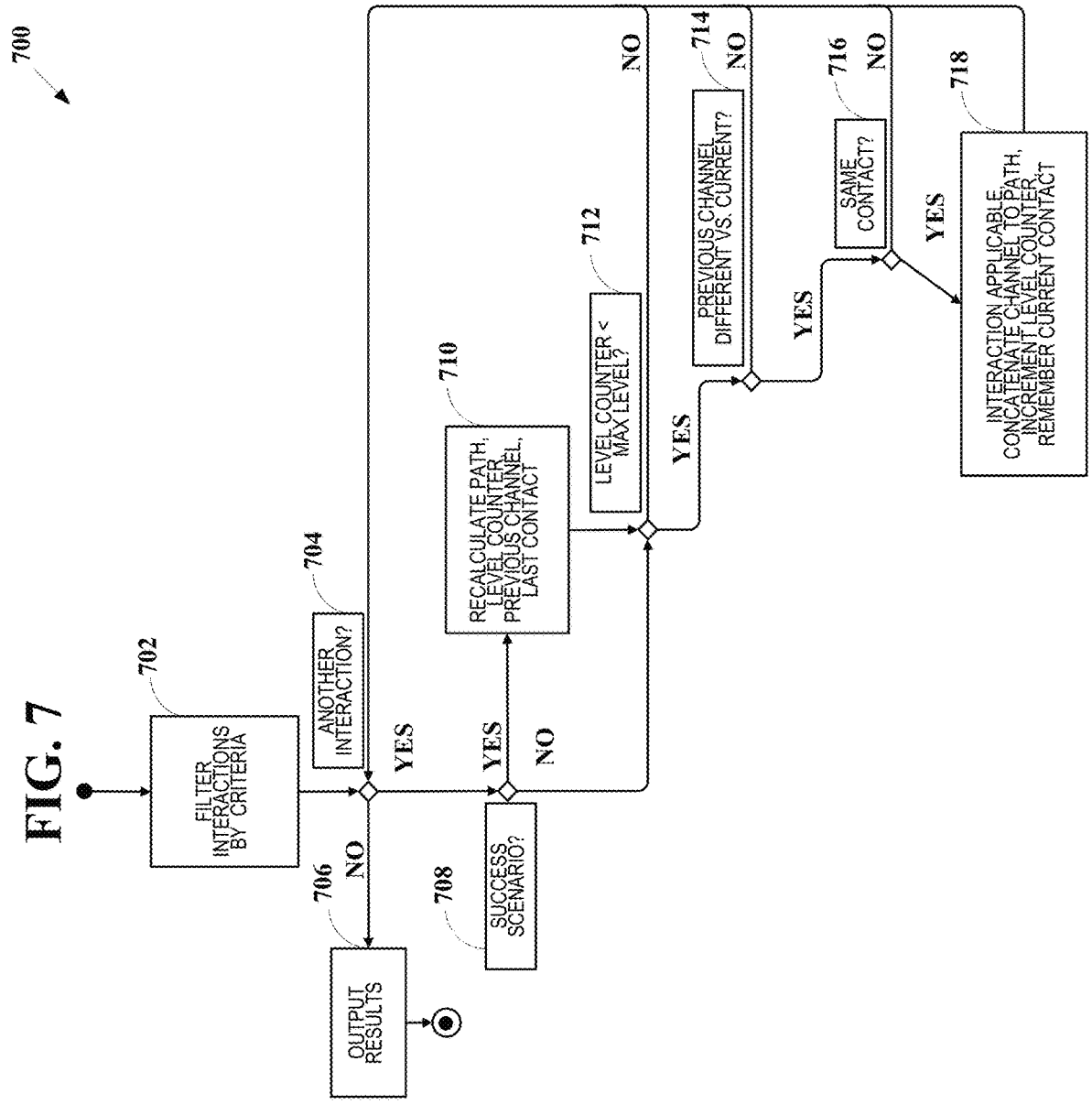
FIG. 7 is a diagram of a method for mining a database, according to an exemplary embodiment.

Referring now to FIG. 7, a diagram 700 is shown of a method for mining a database, according to an embodiment. This method may perform many of the operations of the FIG. 6 flowchart, but is described in terms of a database-oriented implementation to select data for construction of journeys to be processed further and/or displayed. The journeys may be aggregated into paths for display in a Sankey diagram depicted in a graphical user interface.

At the outset, a user may filter interactions based on input restriction criteria, at 702. Restriction criteria may include a particular product, product category, group of products, particular brand, and/or the like for example that may be of interest to a user.

Next, at 704, the method 700 may determine whether another respective interaction has occurred. Here, the method 700 may periodically determine whether other respective interactions have occurred, so that the data mining may be updated automatically. Alternatively, step 704 may be triggered by a change to one of the data sources. If no other respective interactions have occurred, the method 700 may proceed to output search results, at 706. If another respective interaction has occurred, the method 700 may proceed to 708.

At 708, the method 700 may determine whether the respective interaction is a success scenario (e.g., purchase of a product or other situation that has met the target criteria). If the respective interaction is a success scenario, one or more database variables (e.g., path, level counter, previous channel, last contact, and/or the like) used for graphically rendering the user interaction data, as will be described, may be recalculated at 710. In an embodiment, after the recalculation, the method 700 may proceed to steps 712-716. In an embodiment, if the interaction is not a success scenario, the method 700 may proceed to steps 712-716.

At step 712, the method may compare the level counter variable to a maximum level restriction value (e.g., the parameter N value). For example, the comparison of the level counter to a maximum level restriction may be used to ensure that a frequently traversed journey does not visually obstruct other journeys, if graphically rendered. If the level counter is not less than a maximum level restriction, the method 700 may proceed to output results, at 706. On the other hand, if the level counter is less than a maximum level restriction, the method 700 may proceed to 714.

At 714, the method 700 may determine whether a respective interaction has changed channels. In other words, the method 700 may determine whether the previous channel of the respective interaction is the same as its current channel. If the channel has not changed, the method 700 may proceed to output results, at 706. On the other hand, if the channel has changed, the method 700 may proceed to 716.

At 716, the method 700 may determine whether contact information for the respective interaction has changed. If the contact information has not changed, the method 700 may proceed to output results, at 706. On the other hand, if the contact information has changed, the method 700 may proceed to 718. At 718, the method 700 may concatenate the channel to the path, increase the level counter, and/or store contact information. The method 700 may then proceed to output results at 706.

Referring now to FIG. 8, a diagram 800 is shown of a SQL query for finding paths, according to an embodiment. This exemplary and non-limiting query may perform a frequency mining algorithm that determines the number of contacts that participated in the same journey. The contacts that participated in the same journey may thus be aggregated into a contact population that followed a given path, or particular sequence of contact interactions. The various paths may then be displayed in a Sankey diagram depicted in a graphical user interface.

In this example, the query may operate on input data selected as previously described, in this case from path CA_CJI_PATH. The desired outputs to be passed to a Sankey diagram depiction tool may be the contacts that followed a particular path that led to a target event, the different various paths that were actually followed, and a count of how many of the contacts followed each path. The variable IA_CNT_SUM represents the total number of paths. The variable IC_CNT_SUM represents the total number of unique contacts within a respective path. The variable JOURNEY_PATH represents the sequential historical channel steps the contact followed, e.g., a concatenation of the different channels traversed that comprise the assembled contact journey. The variable RANK_PERC represents the rank percent of the top to lowest paths based on the total number of paths.

The variable IA_CNT is an integer placeholder for calculating the sum of the journeys. The variable CONTACT_KEY represents the contact key or identification number of a particular contact. The variable iv_depth defines the number of channels to consider in the contact journey, five in this example. The variable iv_from defines the start date of the interactions to be considered, and the variable iv_to defines the end date of the interactions to be considered.

The output results are shown below the SQL listing. In this example, seven different paths were found, and are listed in increasing order of the percentage of the total flow. Thus, this query is capable of determining the frequency of contact habits by analyzing contact interactions to show the most commonly occurring channel-based sequential contact patterns or journeys. The query results may describe in aggregate terms how contacts are getting to the specified end point versus time, and via which channels.

Referring now to FIG. 9, a diagram 900 is shown of a SQL query for finding paths with constraints, according to an embodiment. This exemplary and non-limiting query may perform a frequency mining algorithm with specified constraints. Here, the constraints describe the country where an interaction occurred, e.g., Spain (ES) or Germany (DE). The interactions may be further constrained to a date range, in this example to the calendar year 2014.

The query may operate on input data selected as previously described, in this case from path CA_CJI_PATH. The variable iv_depth may define the number of channels to consider in the contact journey, five in this example. The variable iv_from may define the start date of the interactions to be considered, and the variable iv_to may define the end date of the interactions to be considered. The desired outputs to be passed to a Sankey diagram depiction tool may be the particular paths that contacts followed to a target event, and a count of how many of the contacts followed each path.

The output results are shown below the SQL listing. In this example, ten different paths were found, and are listed in decreasing order of the percentage of the total interaction flow. Note that different numbers of interactions may exist in each particular path. The most frequently taken path for example involves only one direct COMMERCE channel interaction. The next most frequently taken path involves a COMMERCE channel interaction and an EMAIL channel interaction, etc. Note also that the JOURNEY_PATH variable lists interaction channels here in reverse time order, that is, it traces channels from the target event channel backward in time to an initial interaction channel. However, journeys are generally depicted in forward time order in the Sankey diagram for intuitive clarity.

This type of path frequency analysis may help a user, for example a marketing analyst, determine the interaction preferences of contacts in a given place during a given time. The relative importance of different channels may be gleaned from the relative frequency of their appearance in popular paths. For example, in this example all paths had a COMMERCE channel interaction, along with in many cases one other interaction, but in many cases there were two other interactions. This may denote the relative popularity of EMAIL interactions versus PHONE interactions, etc. The relative channel popularity may indicate the relative effectiveness of future marketing campaigns to be directed via various channels, or such campaigns may be designed to encourage more use of currently less-used channels by contacts.

Examples are now provided to describe the interaction dynamics between data selection and user customization of the Sankey diagram provided in a graphical user interface. Historically, users have been required to create queries for a database to run, and a display tool may then be called to depict the results. Users are generally then required to modify the queries to perform data exploration and analysis. Embodiments of the invention enable a much more flexible and intuitive user interaction with the data via customization of the depicted results instead.

Figure 10:
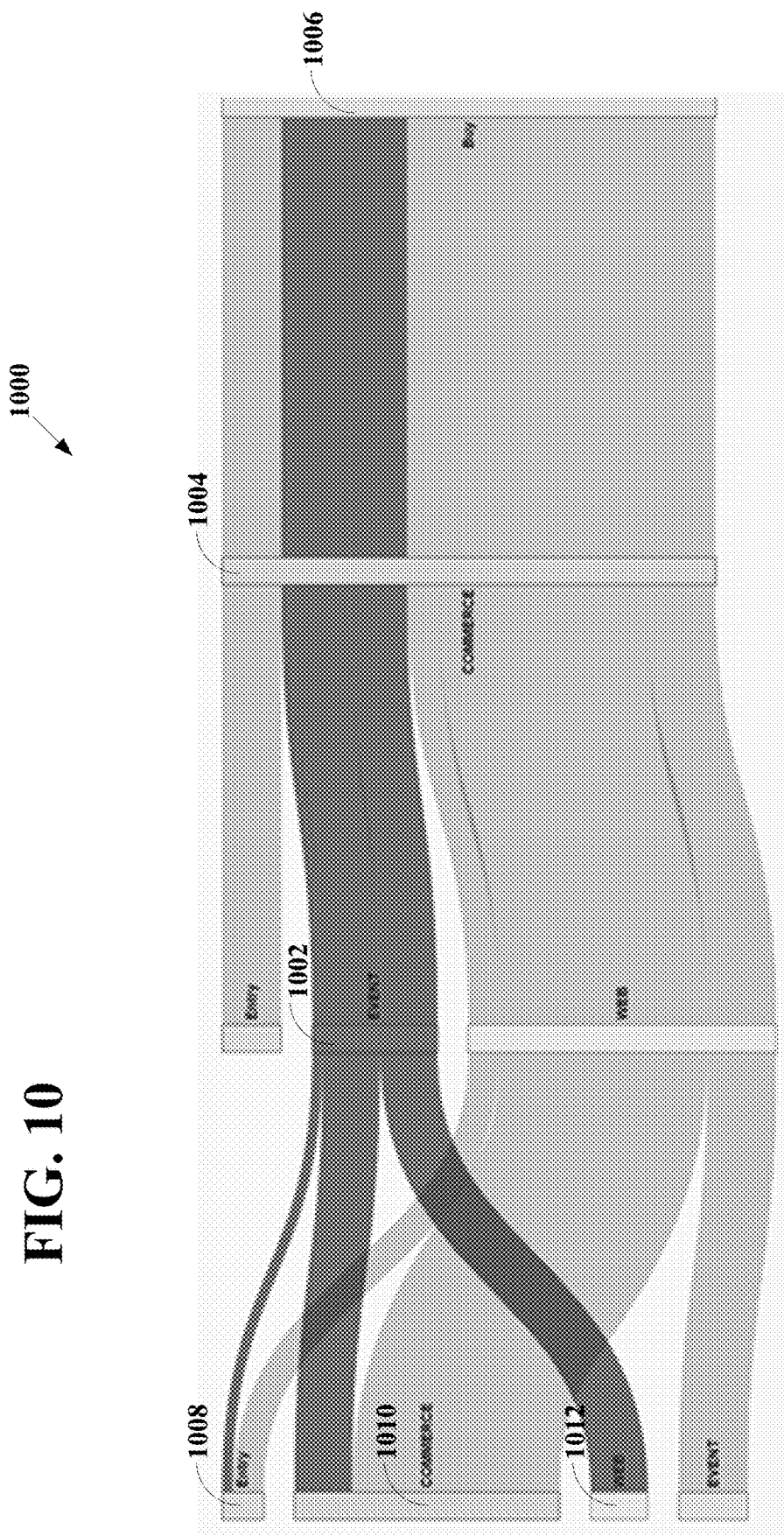
FIG. 10 is a highlighted Sankey diagram, according to an exemplary embodiment.

Referring now to FIG. 10, a highlighted Sankey diagram 1000 is shown, according to an embodiment. The highlighting may be depicted via use of a contrasting color for example, though many other highlighting means will be described later. This Sankey diagram denotes an important feature of contact journey analysis, the ability to create a target contact group based on the contacts whose individual navigational trajectories comprise particular contact journeys or paths. In this example, a user may be interested in understanding the EVENT channel interactions 1002 that led directly to a COMMERCE channel interaction 1004 that led to a successful purchase event 1006. The user may therefore manually select the entire EVENT channel 1002, and embodiments may responsively highlight all the respective journeys comprising the path that proceeds through that channel.

In this case, there are three branches that arrive at the EVENT channel 1002. The uppermost arrives from a previous entry point 1008. Another arrives from a COMMERCE channel event 1010, and a third arrives from a WEB channel event 1012. The relative number of contact journeys in each branch is denoted here by the relative widths of each branch in the Sankey diagram depiction. In this case, the branch from the entry point 1008 is relatively sparsely populated, so it is the narrowest branch of the three in the Sankey diagram depiction.

However, it is possible that the group of contacts who took this somewhat unpopular route to a purchase is a target group of particular interest to a user, because this target group made a purchase after going directly to EVENT channel 1002. This Sankey diagram depiction may thus actually denote the relative effectiveness of a marketing action, such as a trade show or other promotional event, at bringing in the contacts of this target group. Similarly, another target group that proceeded from the WEB channel 1012 may have learned of the promotional event via the internet, perhaps denoting the effectiveness of advertising the promotional event via the internet.

Referring now to FIG. 11, a diagram 1100 is shown of a SQL query related to the FIG. 10 Sankey diagram, according to an embodiment. This query selects a target group of contacts by contact key by looking at interaction data during calendar year 2014 for Spain and Germany that led to a target event via paths with up to three interaction steps. Specifically, the paths of interest are those with interactions in the channels "COMMERCE, EVENT", "COMMERCE, EVENT, COMMERCE", or "COMMERCE, EVENT, WEB" (stated in reverse time order). These paths of interest correspond to, and indeed were selected by a user, in reference to the Sankey diagram of FIG. 10.

The embodiments thus enable a user to customize not only the display in a Sankey diagram of mined data specified via a SQL query, but to customize the selection of the mined data via user interaction with the Sankey diagram itself. In this way, the embodiments may allow a user to explore and investigate contact interactions in an entirely intuitive, visual manner, without requiring the user to write any queries at all. A user may specify data of interest by for example filtering contact interactions by time, the various events or touch points traversed by individual contact navigation trajectories, and by the relative percentage of overall flow in each aggregate contact interaction sequence or path. Such interest specification may be performed by a manually created query or by a query created by embodiments of the present invention in accordance with user Sankey diagram interaction.

In a typical use scenario, a user may identify a particular interaction type record as the end point of interest of a trajectory, such as a purchase denoted by a SHOP_CHECKOUT_SUCCESS interaction for example. Embodiments may then sort records by descending time stamp (oldest to newest), get those interactions and identify the steps taken from various start points to the end point. Embodiments may then aggregate contact journeys for many contacts to determine paths that led to the end point of interest. Embodiments may then summarize the relative flow in the paths by counting the number of contacts that followed each particular path. Embodiments may further depict the paths with flow-proportional widths in a Sankey diagram to enable intuitive visualization of the various events that led to a target event, and may then enable users to customize the Sankey diagram as desired.

One outcome of such customization may be the identification of target groups who participated in interactions via various channels in different combinations and sequences, and thus have similar interaction habits. Such target groups may be of keen interest for further investigation and analysis. Users may thus gain an immediate understanding of contact journey patterns via the highly intuitive graphical user interface used for Sankey diagram depiction. Users may plan subsequent business actions as a result of insight gained regarding target groups via use of the embodiments described.

In-memory database technology may therefore provide not only a technological advance, by processing an immense amount of data in real time, but also a business advance, by enabling better targeting of a group of contacts. Embodiments may enable quantitative analysis of correlations between channels and the observed impact on contact behavior. Such analysis may enable precisely focused marketing campaigns for example that reach the right market segment via the right channel at the right time. Such campaigns may be more effective than unfocused broadcasts or "weapons of mass distraction". Better managed business actions may prove less annoying for contacts and may potentially provide a better return on investment.

Figure 12:
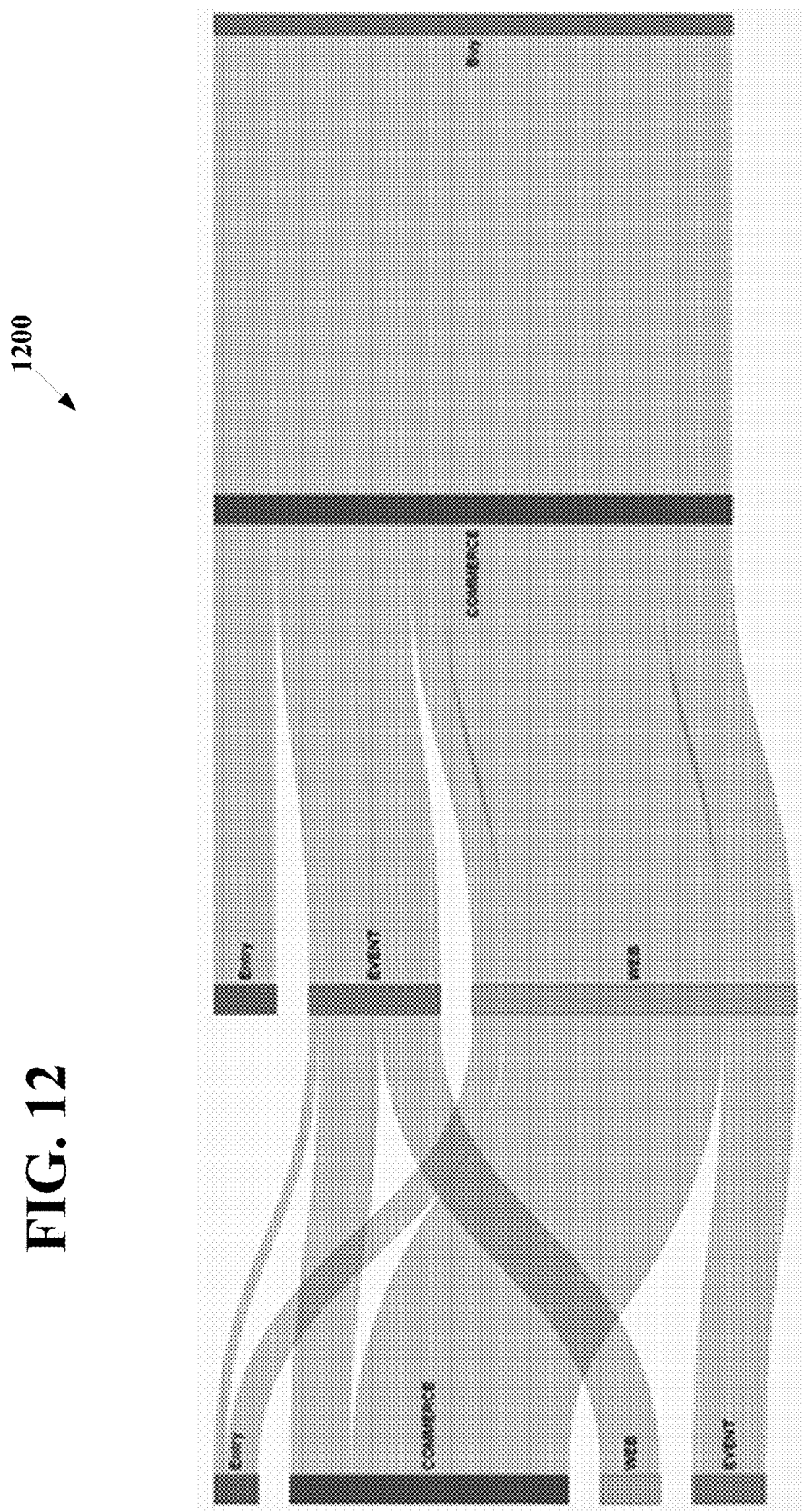
FIG. 12 is an unhighlighted version of the Sankey diagram of FIG. 10, according to an exemplary embodiment.

Referring now to FIG. 12, an unhighlighted version 1200 of the Sankey diagram of FIG. 10 diagram is shown, according to an embodiment. This Sankey diagram may be produced when a user does not select any particular paths and presses a "create target group" button for example to find all paths and the groups that followed them. The Sankey diagram may also be produced when the user selects a previously selected highlighted path a second time to toggle the path selection off for example. The unhighlighted version 1200 of the Sankey diagram thus represents all contact interactions meeting the broader criteria previously described, e.g., interaction data during calendar year 2014 for Spain and Germany that led to a target event via paths with up to three interaction steps.

Referring now to FIG. 13, a diagram 1300 is shown of a SQL query related to the FIG. 12 Sankey diagram, according to an embodiment. The previously specified particular paths of interest that were highlighted in FIG. 10 are notably no longer constraints in this query. Only the broader criteria previously described appear in this query. The total number of contacts may therefore be far larger than in the previously highlighted contact population subset.

Figure 14:
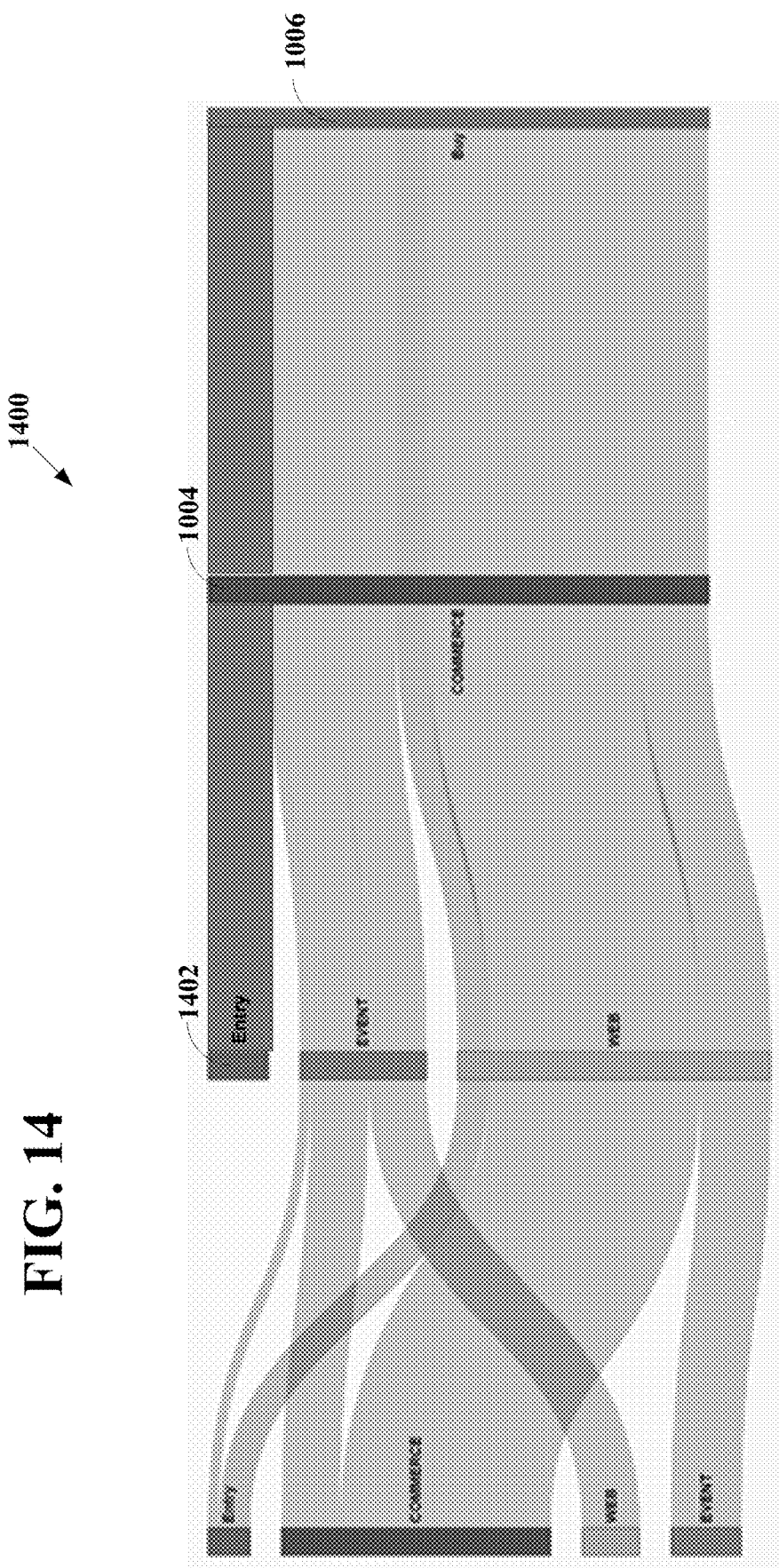
FIG. 14 is a differently highlighted Sankey diagram, according to an exemplary embodiment.

Referring now to FIG. 14, a differently highlighted Sankey diagram 1400 is shown, according to an embodiment. The highlighting may be depicted via use of a different contrasting color for example, though many other highlighting means will be described later. This Sankey diagram denotes a different target group based on the contacts whose individual navigational trajectories comprise a different path of interest. In this example, a user may be interested in understanding the interactions that led from entry point 1402 directly, without other intervening interactions involving different channels, to the COMMERCE channel interaction 1004 that led to the successful purchase event 1006. The user may therefore manually select the entry point 1402, and embodiments may responsively highlight the path that proceeds from that entry point toward the target event.

Referring now to FIG. 15, a diagram 1500 is shown of a SQL query related to the FIG. 14 Sankey diagram, according to an embodiment. Note that the constraint of JOURNEY_PATH=COMMERCE corresponds to and denotes the user selection of the path highlighted in the Sankey diagram of FIG. 14.

Figure 16:
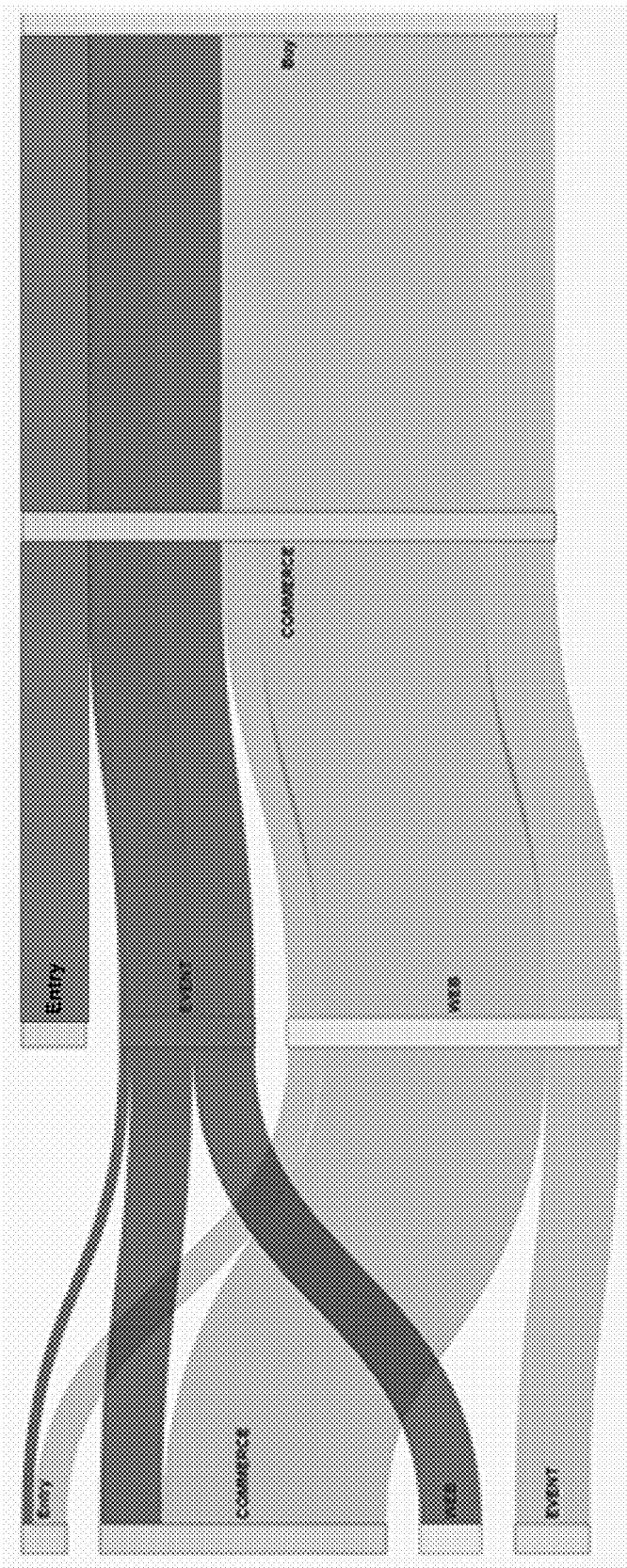
FIG. 16 is a Sankey diagram with multiple paths highlighted, according to an exemplary embodiment.

Referring now to FIG. 16, a Sankey diagram 1600 is shown with multiple paths highlighted, according to an embodiment. In this example, the paths that were individually selected in FIGS. 10 and 14 may both be selected and highlighted. This diagram further denotes the flexibility of user and system path selection and user and system creation of target groups. For example, a user may manually select a path, and a path algorithm may have selected another path, and the result is the production of a combined population of contacts of interest.

Figure 17:
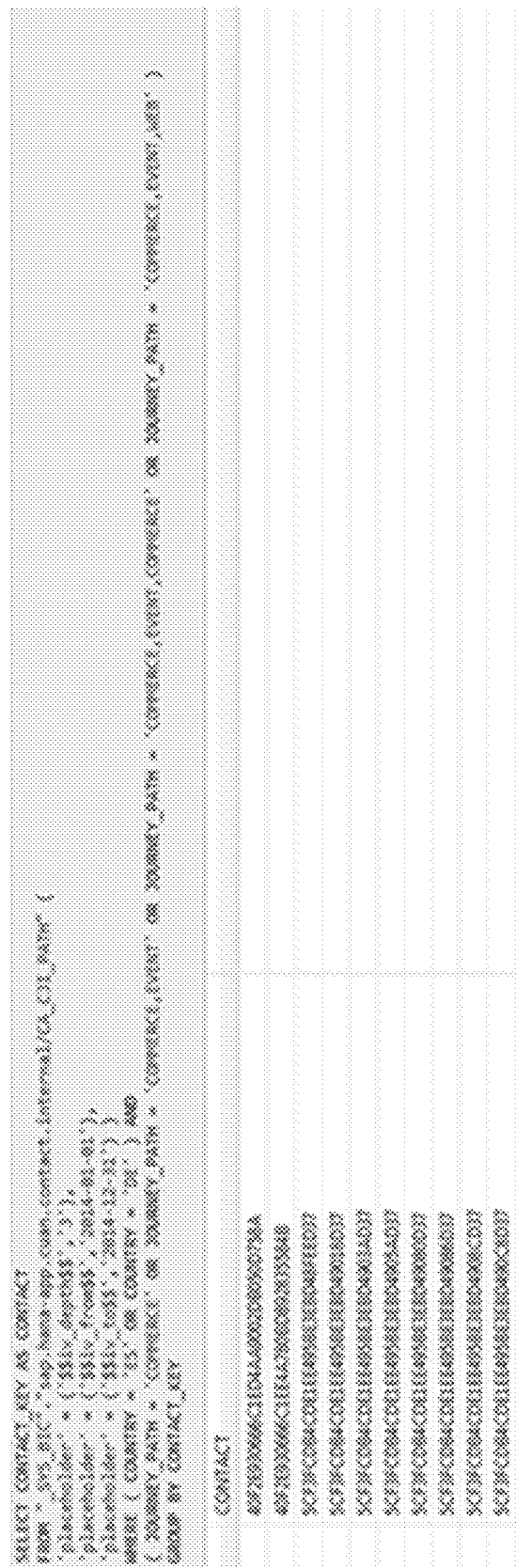
FIG. 17 is a diagram of a SQL query related to the FIG. 16 Sankey diagram, according to an exemplary embodiment.

Referring now to FIG. 17, a diagram 1700 is shown of a SQL query related to the FIG. 16 Sankey diagram, according to an embodiment. Note that the constraint of JOURNEY_PATH=COMMERCE corresponds to and denotes the selection of the path highlighted in the Sankey diagram of FIG. 14, and the remaining JOURNEY_PATH constraints correspond to and denote the selection of the path highlighted in the Sankey diagram of FIG. 10. Creation of these constraints may result directly from user customizations of the Sankey diagram.

Examples are now provided of embodiments that may present multiple business scenarios in a single Sankey diagram. Details below describe the definition of the nodes of a Sankey diagram, and the links between them showing the direction and flow quantity. Embodiments may also depict multiple end points of possible interest. Although these examples relate to business scenarios, the embodiments are not limited to business applications but may process any contact interaction data.

Figure 18:
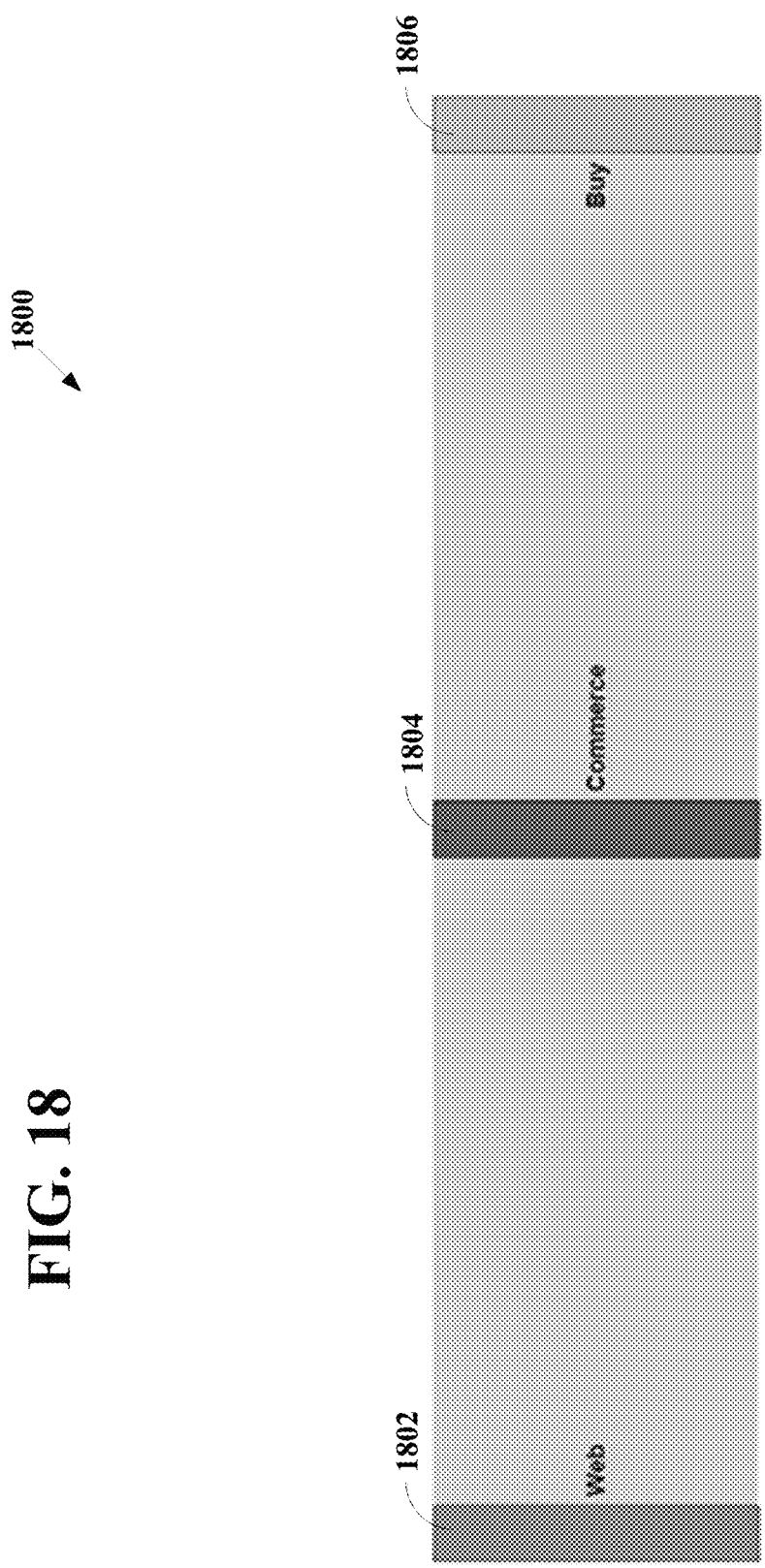
FIG. 18 is a Sankey diagram representing an exemplary business scenario, according to an exemplary embodiment.

Referring now to FIG. 18, a Sankey diagram 1800 is shown representing an exemplary business scenario, according to an embodiment. This Sankey diagram represents a single path to a target event, e.g., a successful purchase. Three contacts may have interacted with a business enterprise, and their interactions may be depicted in Sankey diagram 1800 as a path spanning particular event nodes.

User A may for example review a product on the internet at 9 pm Monday (a WEB channel interaction), add the product to a shopping cart at 905 pm (a COMMERCE channel interaction), and pay for the product at 10 pm (a BUY event).

User B may for example review a product on the internet at 9 am Monday, add the product to a shopping cart at 9 am Tuesday, and pay for the product at 10 pm Wednesday.

User C may for example review a product on the internet at 1 pm Monday, add the product to a shopping cart at 2 pm Monday, but not pay for the product until 10 pm Friday.

The Sankey diagram 1800 thus represents a series of events that occur in a given order. The absolute date and time of each contact interaction will not have a direct impact on the diagram, as long as the interactions fall within a user-specified time span of interest. All WEB channel interactions are represented by node 1802, all COMMERCE channel interactions are represented by node 1804, and all BUY events are represented by node 1806 in this example. Since all of the contacts follow similar contact journeys, only one path is required in the Sankey diagram 1800.

Figure 19:
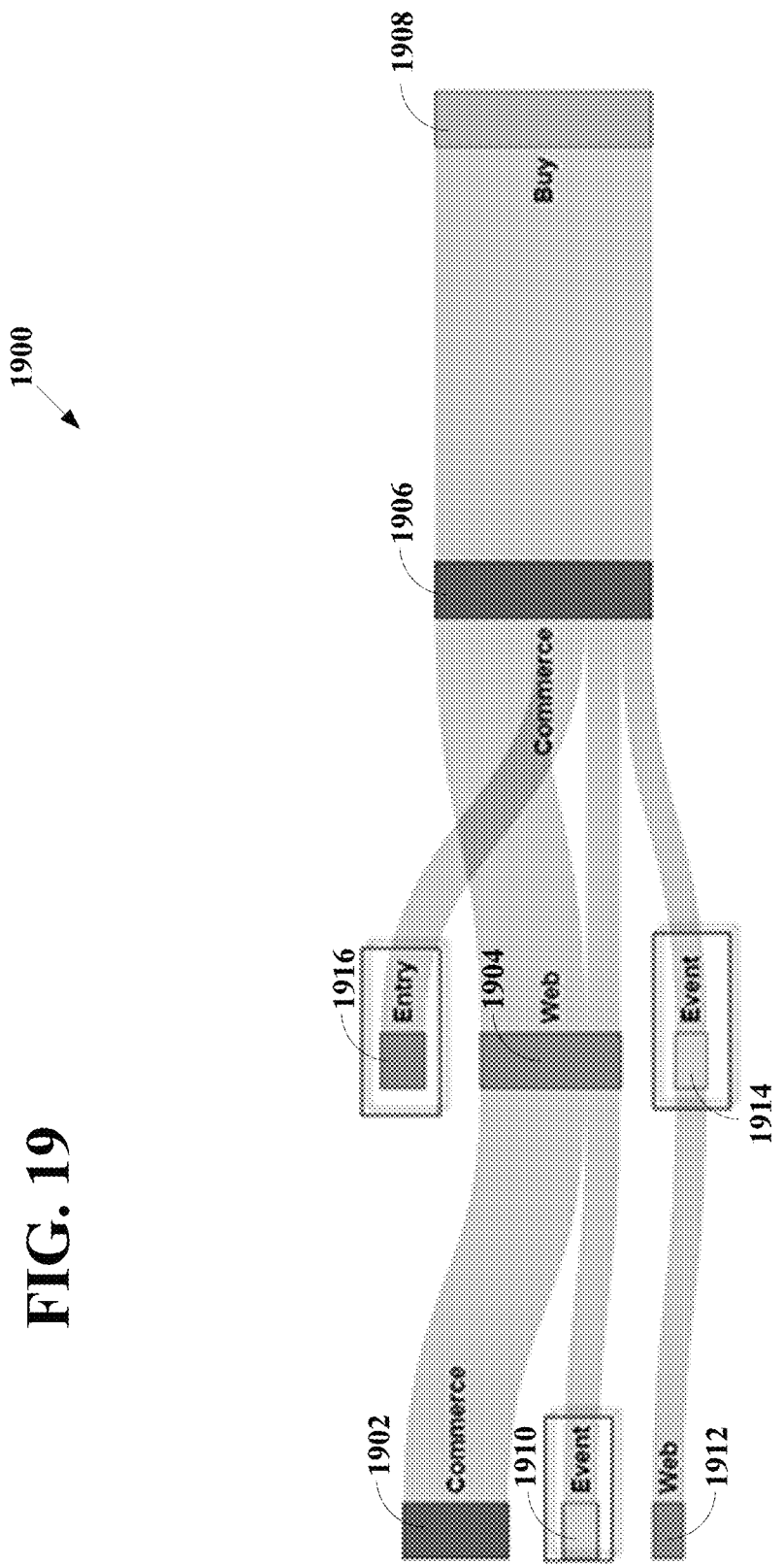
FIG. 19 is a diagram of a Sankey diagram with multiple nodes that represent the same interaction, according to an exemplary embodiment.

Referring now to FIG. 19, a Sankey diagram 1900 is shown with multiple nodes that represent the same interaction, according to an embodiment. In this example, there are multiple contact groups that proceed to a target event, e.g., a successful purchase, in different ways during a user-specified time span of interest. Multiple nodes may therefore be provided in the Sankey diagram 1900 to represent the same interaction. Also, in this example a successful purchase occurred only after three interactions in some contact journeys, while in others fewer total interactions occurred.

User group A may for example add a product to a shopping cart (a COMMERCE channel interaction 1902), review the product on the internet (a WEB channel interaction 1904), open the shopping cart (a COMMERCE channel interaction 1906), then pay for the product (a BUY event 1908).

User group B may for example open a promotional email (an EVENT channel interaction 1910), review the product on the internet (a WEB channel interaction 1904), add the product to a shopping cart (a COMMERCE channel interaction 1906), then pay for the product (a BUY event 1908).

User group C may for example review the product on the internet (a WEB channel interaction 1912), open a promotional email (an EVENT channel interaction 1914), add the product to a shopping cart (a COMMERCE channel interaction 1906), then pay for the product (a BUY event 1908).

User group D may for example add a product to a shopping cart (a COMMERCE channel interaction 1906), then pay for the product (a BUY event 1908) without any other interactions.

In this example, an EVENT node represents the interaction of opening the promotional email. However, in some instances contacts buy without opening the email, some contacts review the product before opening the email (e.g., group C), while others review the product after opening the email (e.g., group B). These differences in contact behavior may be important and may therefore need to be depicted in a distinctive manner.

To visually distinguish the path that has less than three interactions, e.g. the user group D behavior, embodiments may add a new ENTRY node 1916 to the Sankey diagram 1900. Also, embodiments may use two EVENT nodes to represent the same interaction that may occur at different positions in history. Thus, EVENT node 1910 may denote the opening of the email before reviewing the product, while EVENT node 1914 may denote the opening of the email after reviewing the product. The result is a visually clear representation of the aggregated contact interaction sequences leading to a target event of interest.

Figure 20:
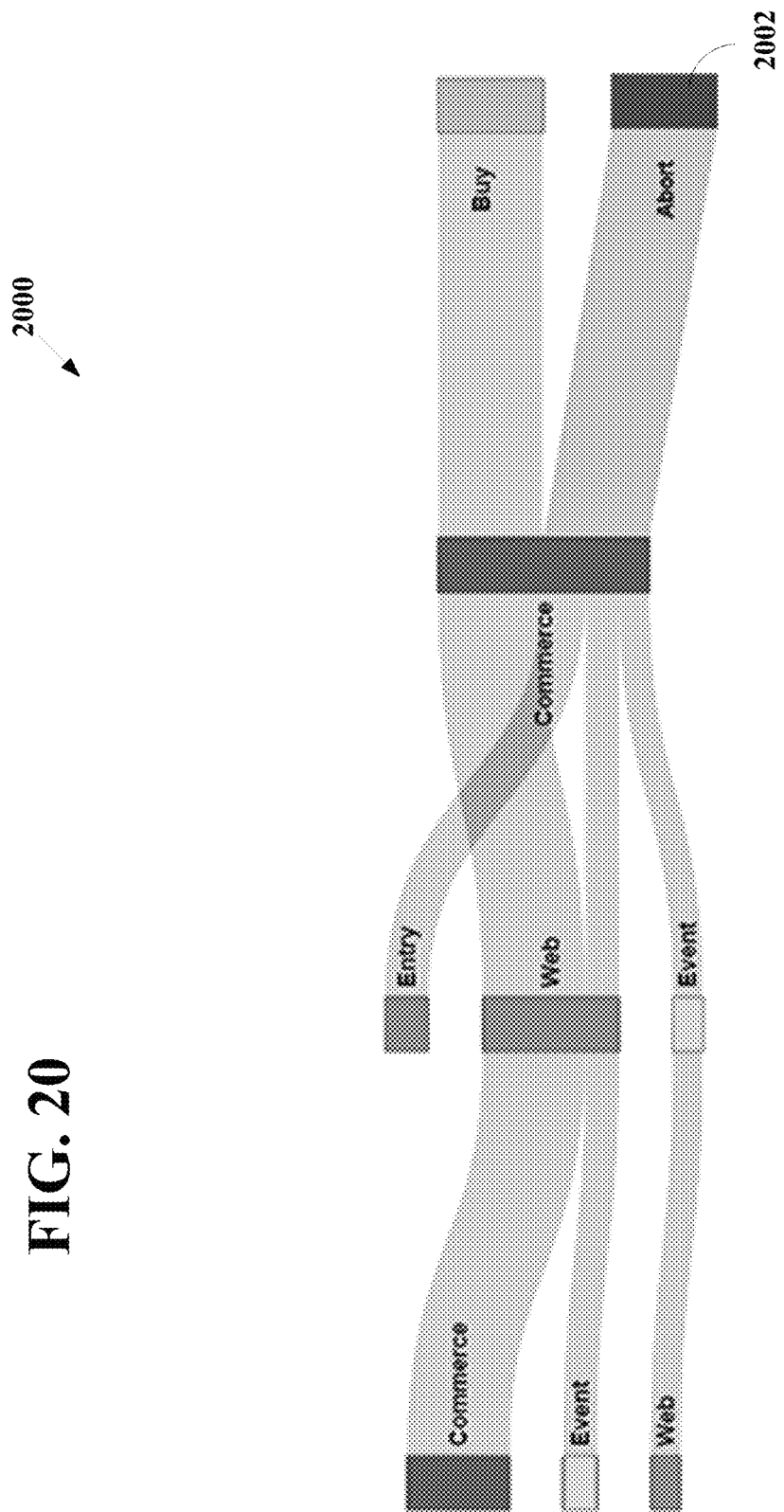
FIG. 20 is a Sankey diagram representing multiple business scenarios, according to an exemplary embodiment.

Referring now to FIG. 20, a Sankey diagram 2000 is shown representing multiple business scenarios, according to an embodiment. This Sankey diagram is similar to that of FIG. 19, but now represents two target events of interest, e.g., the purchase event previously described and an aborted purchase. In many instances, market analysts are very interested in those contacts who very nearly proceed to a successful purchase, e.g., by placing an item in a shopping cart, but who for some reason then do not actually buy the item. These situations may denote a point of failure or customer dissatisfaction that needs to be addressed to increase successful purchases.

Embodiments may therefore add an ABORT event 2002 as an alternative end point for paths represented in Sankey diagram 2000. Different end events may be distinguished via contrasting colors in the display, as previously noted, although many other ways of visually highlighting items may be used, as will be described. In this example, about as many aborted purchases occurred as successful purchases, so the final path widths are similar. In a different use scenario, that of a customer support situation, the alternate target event of interest may be a crash event that leads to customer support inquiries. Any target event set may be represented as shown however, and there is no limit to the number of different target events that may be explored and displayed.

Further examples of Sankey diagram customization enabled by the embodiments are now provided. In each example, methodologies for selecting or filtering data to be displayed, and the corresponding methodologies for depicting the Sankey diagram elements in a graphical user display, may be described together or shown in related figures.

Figure 21:
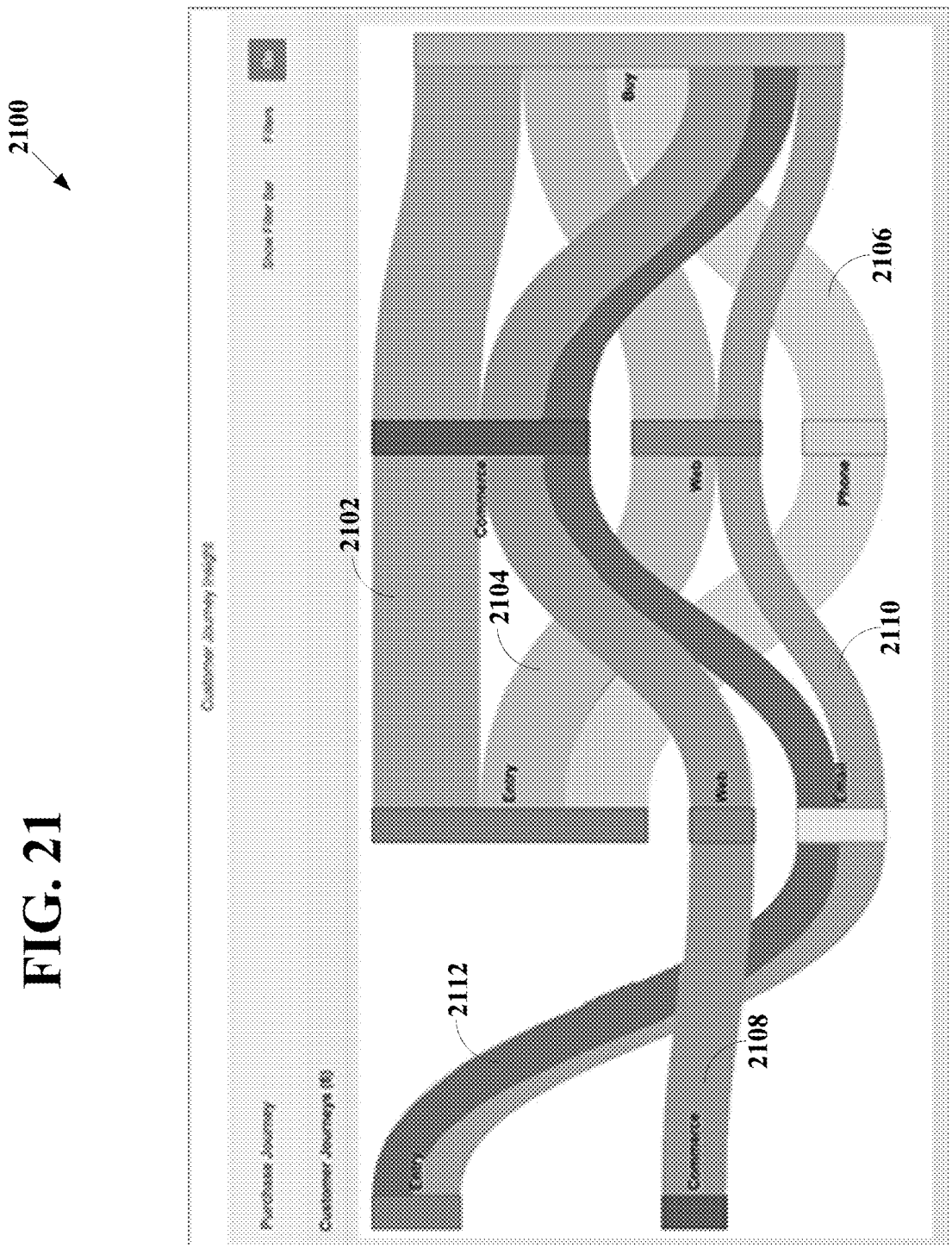
FIG. 21 is a Sankey diagram with coloring depicting path quantities, according to an exemplary embodiment.

Referring now to FIG. 21, a Sankey diagram 2100 is shown with coloring depicting path quantities, according to an embodiment. Sankey diagrams are typically used to visualize flow and density (percentage of a total population) in a given path. However, there is no particular standard defining the numerical value of a quantity depicted in a given path. Use of numerical values or text characters to denote data represented in a path can clutter the limited space available in a graphical user interface. Therefore, embodiments may employ other ways to depict the relevance of Sankey path quantities.

Sankey diagram paths may be colored according to predefined customized settings that map a path quantity to a color for a given context (e.g., a business scenario). This visual color based approach enables embodiments to describe Sankey diagram paths immediately and intuitively. Embodiments may present information to a user about path quantities in circumstances where path width alone may not provide sufficient distinction. In small displays, as used in mobile computing devices for example, the differences between path widths representing similar flow quantities may not be easy to discern.

Each path in FIG. 21 may be depicted in a color selected from a color map. Path 2102, which is widest and thus describes the most popular of the paths depicted, may be depicted in a first color. Path 2112, which is narrowest and thus describes the least popular of the paths depicted, may be depicted in a second color. Other paths 2104-2110 each with various quantities and widths may be depicted in other colors selected from the color map based on the quantities they each represent.

Figure 22:
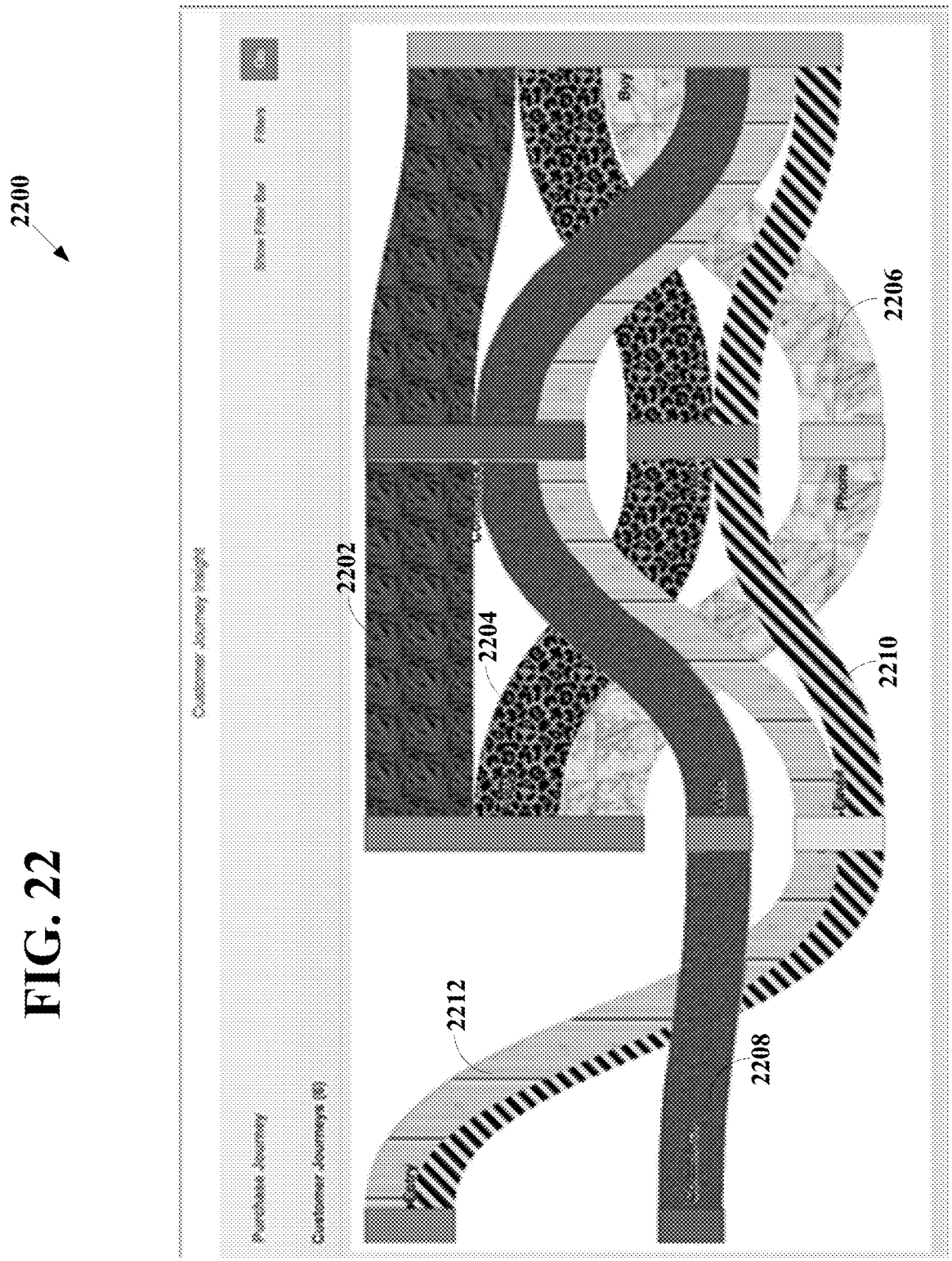
FIG. 22 is a Sankey diagram with colored patterns depicting path quantities, according to an exemplary embodiment.

Referring now to FIG. 22, a Sankey diagram 2200 is shown with colored patterns depicting path quantities, according to an embodiment. Each path in FIG. 22 may be depicted in a colored pattern selected from a colored pattern map. Path 2202, which is widest and thus describes the most popular of the paths depicted, may be depicted in a first colored pattern. Path 2212, which is narrowest and thus describes the least popular of the paths depicted, may be depicted in a second colored pattern. Other paths 2204-2210 with varying quantities and widths may be depicted in other colored patterns selected from the colored pattern map based on the quantities they each represent. More generally, embodiments may employ any type of visual effect, texture, background image, or visual pattern other than color or together with color, video, or animation to provide an intuitively recognizable visual meaning to the Sankey diagram path flow quantities without using an alphanumeric description.

Referring now to FIG. 23, a diagram 2300 is shown of a table for defining path quantity depiction representations, according to an embodiment. For each of potentially many contexts and path flow density or quantity ranges, a corresponding pattern to be used for representing a path in a Sankey diagram is shown. During Sankey diagram depiction, embodiments may use the context and path quantity for each path to be displayed to look up a pattern from the table to use for depiction of the path.

Figure 24:
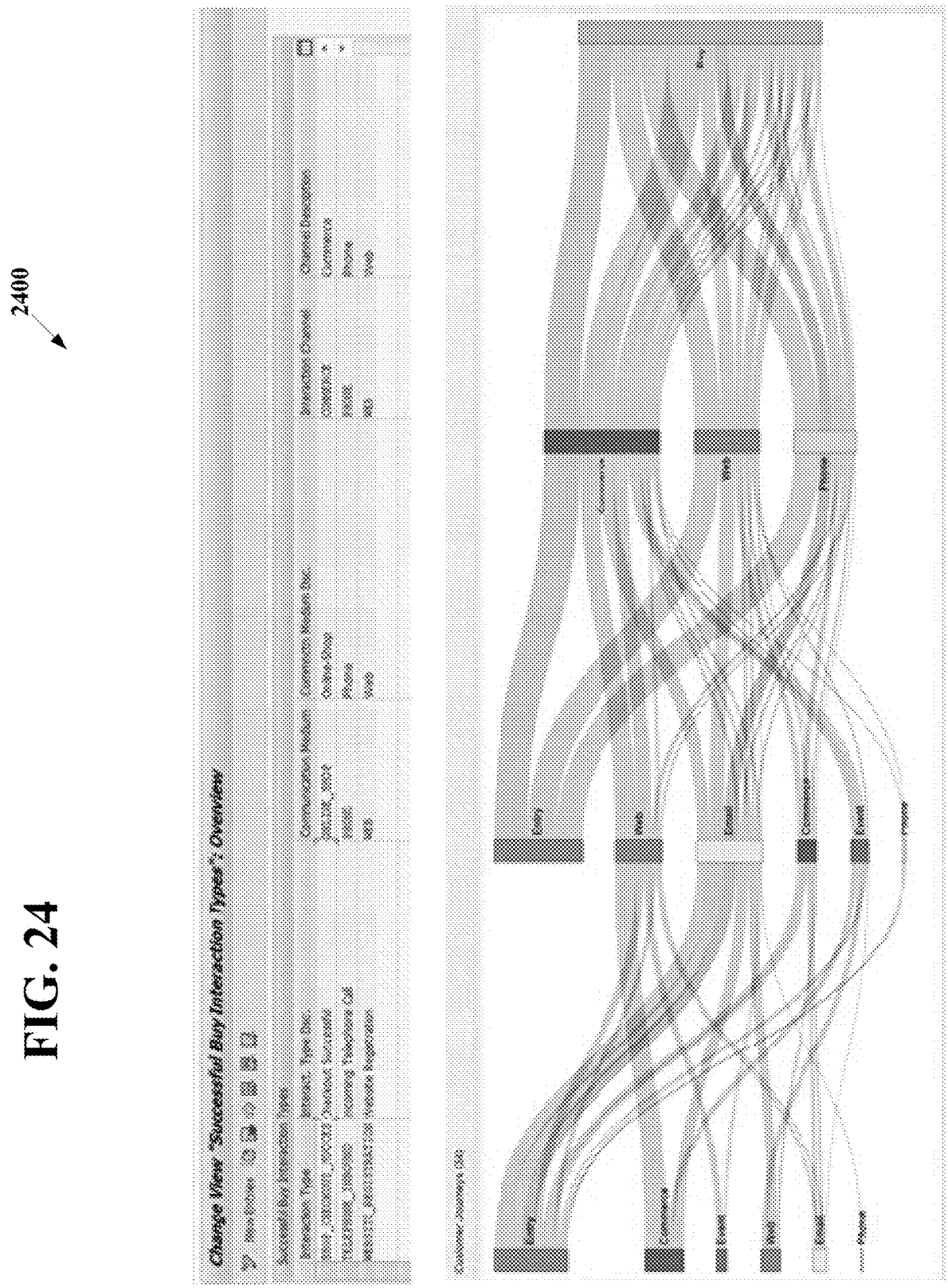
FIG. 24 is a Sankey diagram depicting filtered data, according to an exemplary embodiment.

Referring now to FIG. 24, a Sankey diagram 2400 depicting filtered data is shown, according to an embodiment. Embodiments may filter the data in real time according to metadata indicating the associated data records to provide the data to be filtered. The metadata may be provided by a user and stored in a metadata database.

In this example, data to be depicted is filtered to include only journeys including interactions of each of the types "SHOP_CHECKOUT_SUCCESSFUL", "TELEPHONE_INBOUND" and "WEBSITE_REGISTRATION". The journeys including these filtered interactions, and thus having three defined endpoints, are then depicted in the Sankey diagram as shown. The metadata may define a stored starting point for a user to review contact interactions.

Figure 25:
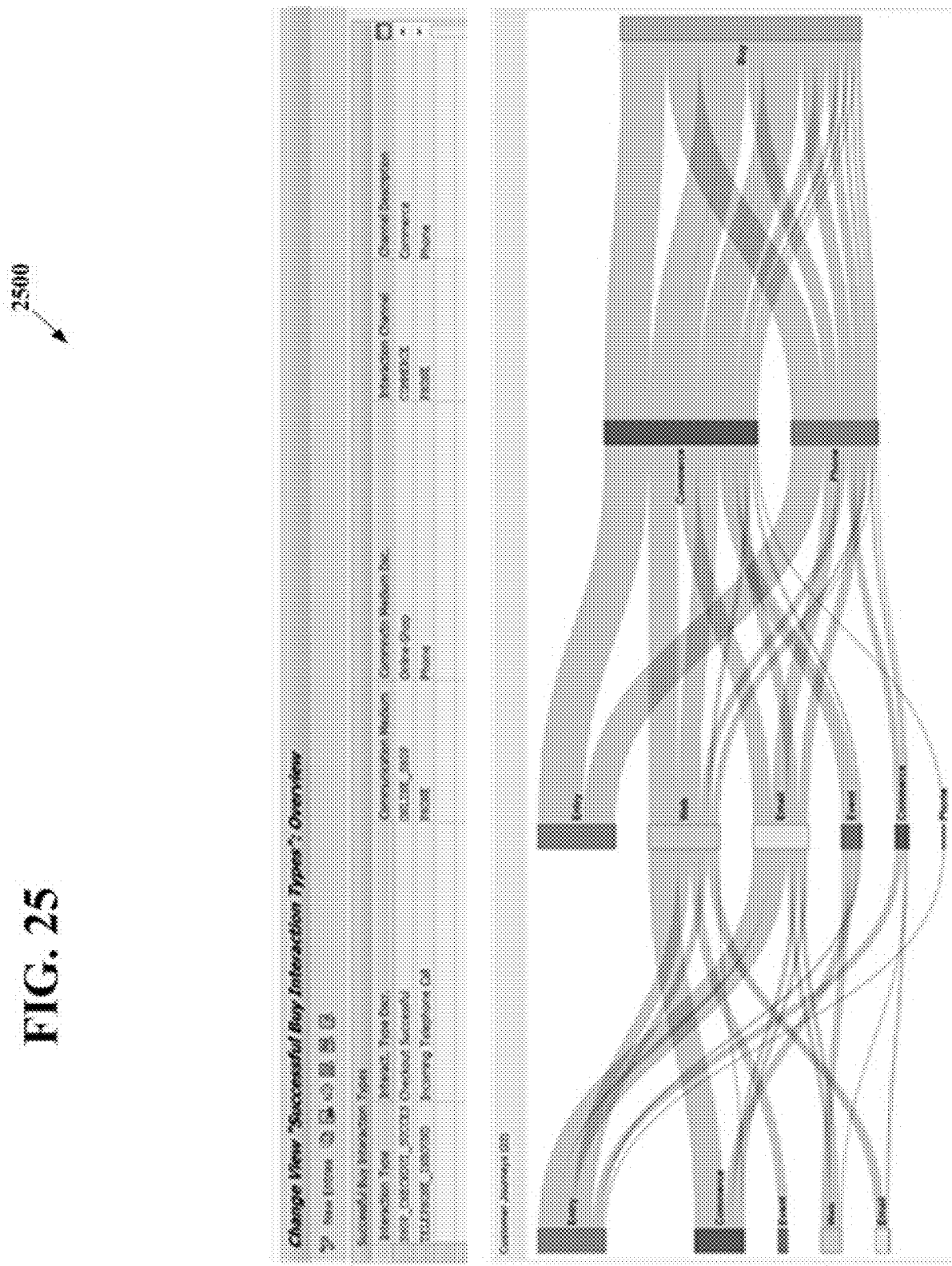
FIG. 25 is a Sankey diagram depicting further filtered data, according to an exemplary embodiment.

Referring now to FIG. 25, a Sankey diagram 2500 depicting further filtered data is shown, according to an embodiment. The journeys previously selected were filtered further in real time to depict only journeys including interactions of types "SHOP_CHECKOUT_SUCCESSFUL" and "TELEPHONE_INBOUND". The journeys including these filtered interactions, and thus having two defined endpoints, are then depicted in the Sankey diagram as shown.

Figure 26:
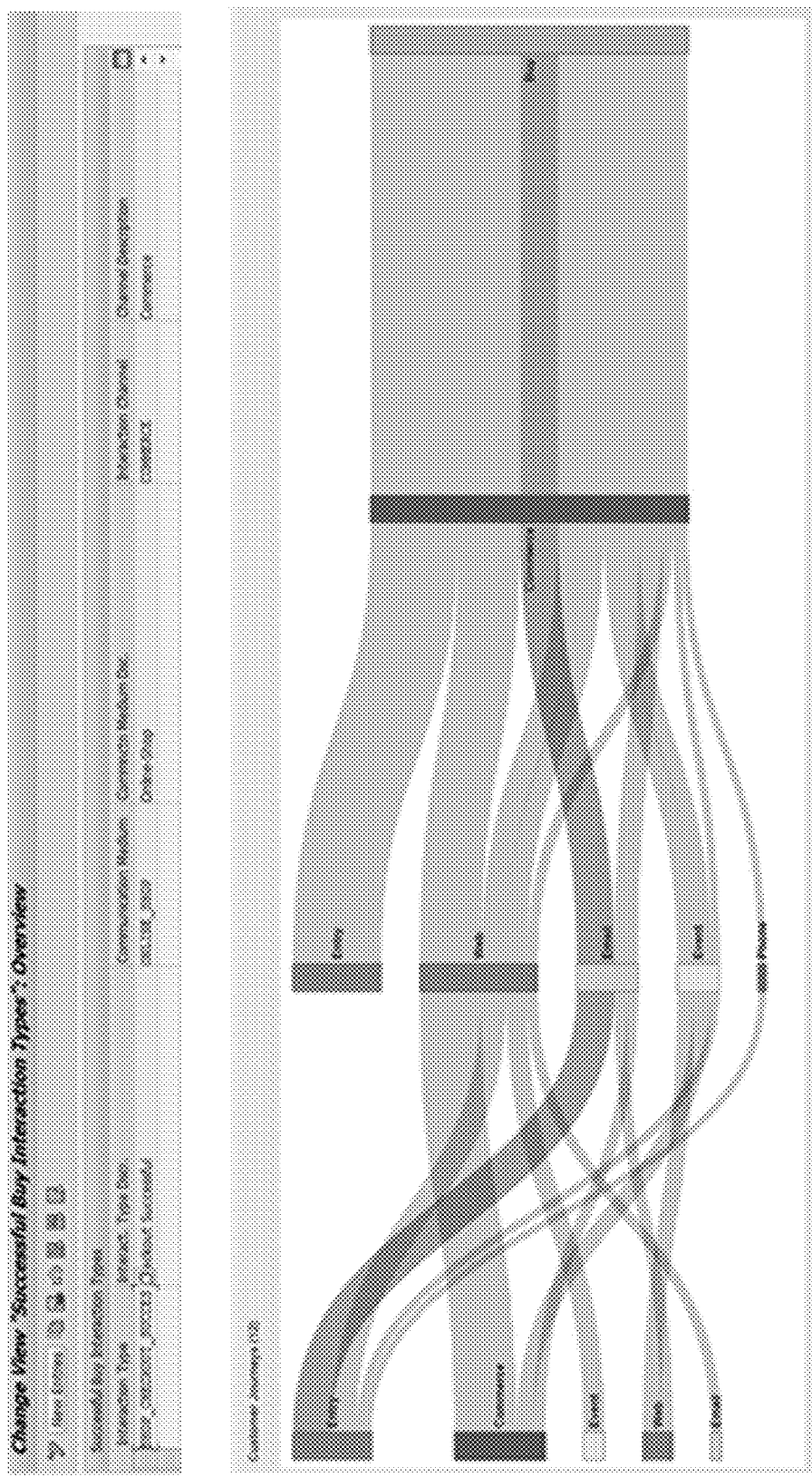
FIG. 26 is a Sankey diagram depicting even further filtered data, according to an exemplary embodiment.

Referring now to FIG. 26, a Sankey diagram 2600 depicting even further filtered data is shown, according to an embodiment. The journeys previously selected were filtered further in real time to depict only journeys including interactions of the type "SHOP_CHECKOUT_SUCCESSFUL".

The journeys including these filtered interactions, and thus having one defined endpoint, are then depicted in the Sankey diagram as shown. Each successive filtering shown may be controlled by a user interacting with the Sankey diagram or by the metadata stored in the metadata database, or both. A data mining algorithm may also perform the filtering to describe different interaction sequences to be detected, including different numbers of end points, leading to a target criterion.

Figure 27:
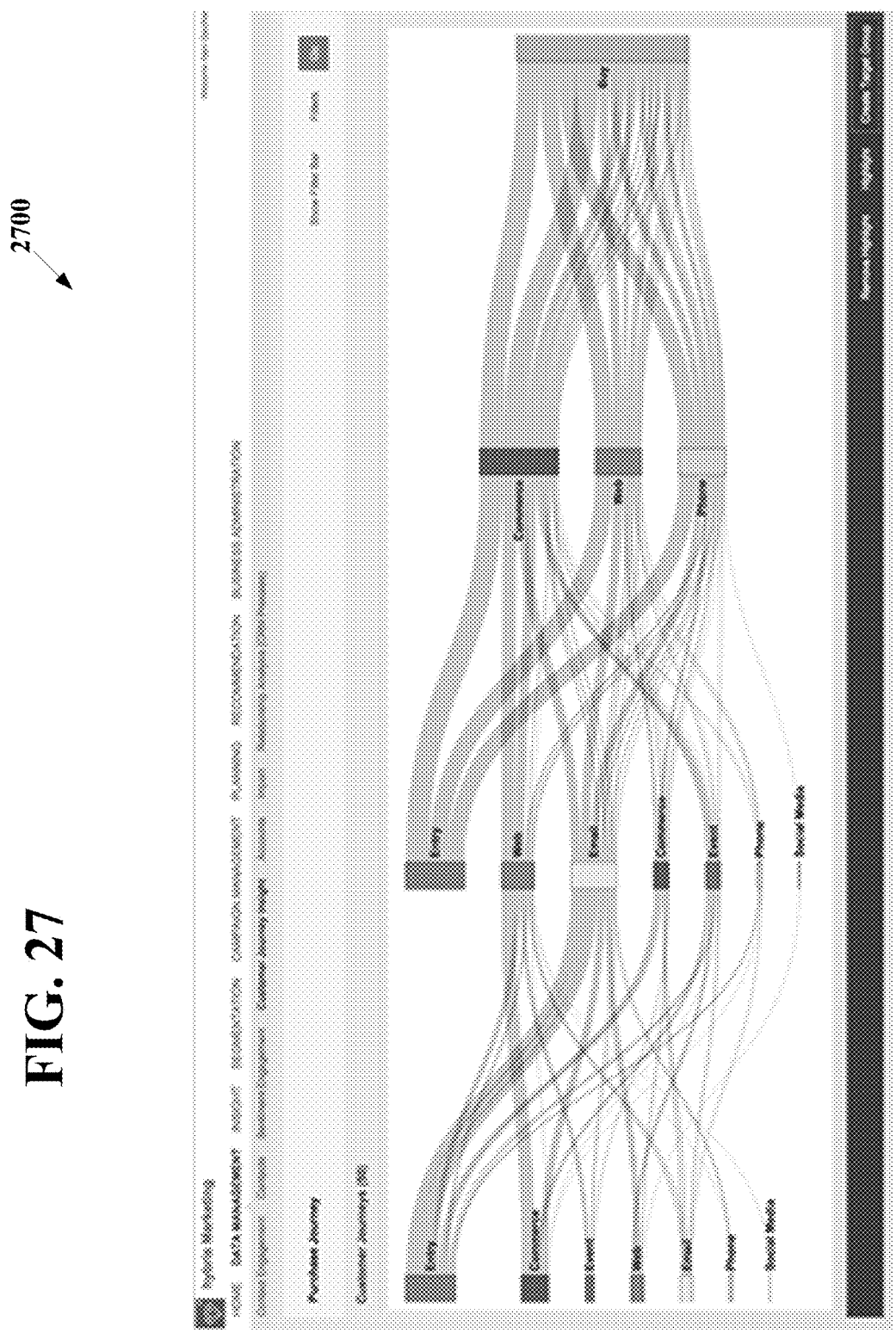
FIG. 27 is a Sankey diagram with information sorted by frequency, according to an exemplary embodiment.

Referring now to FIG. 27, a Sankey diagram 2700 is shown with information sorted by frequency, according to an embodiment. A general goal of an analytical discovery tool (with or without Sankey visualization of the underlying data) may be to enable the user to find a critical mass of data, or a recurring pattern, for which a business decision or assessment may then be made. Meeting this goal relies on the ability of the user to ascertain in advance where to look, and set query parameters accordingly. A "preset" filter that could help a user with an initial overview of the contact interaction data could be of particular use in situations where the mass of data is overwhelming.

Embodiments may therefore run a frequency assessment algorithm to suggest specific values for the query to return the most interesting or critical mass of data. Uncovering the data the user is looking for takes the guessing out of the process for the user. The Sankey diagram may depict the paths in popularity order, e.g., with the most popular paths proceeding through the most popular events shown from the top down.

In one example, the frequency assessment algorithm may select a count(*) from events where the date is between a start date and an end date. In another example, the frequency assessment algorithm may select a count(*) from interaction events of a particular type. Similar queries may be executed sequentially across various data ranges to ascertain which filters return the highest set of records. Any concentration of data may then be used as a preset filter.

Figure 28:
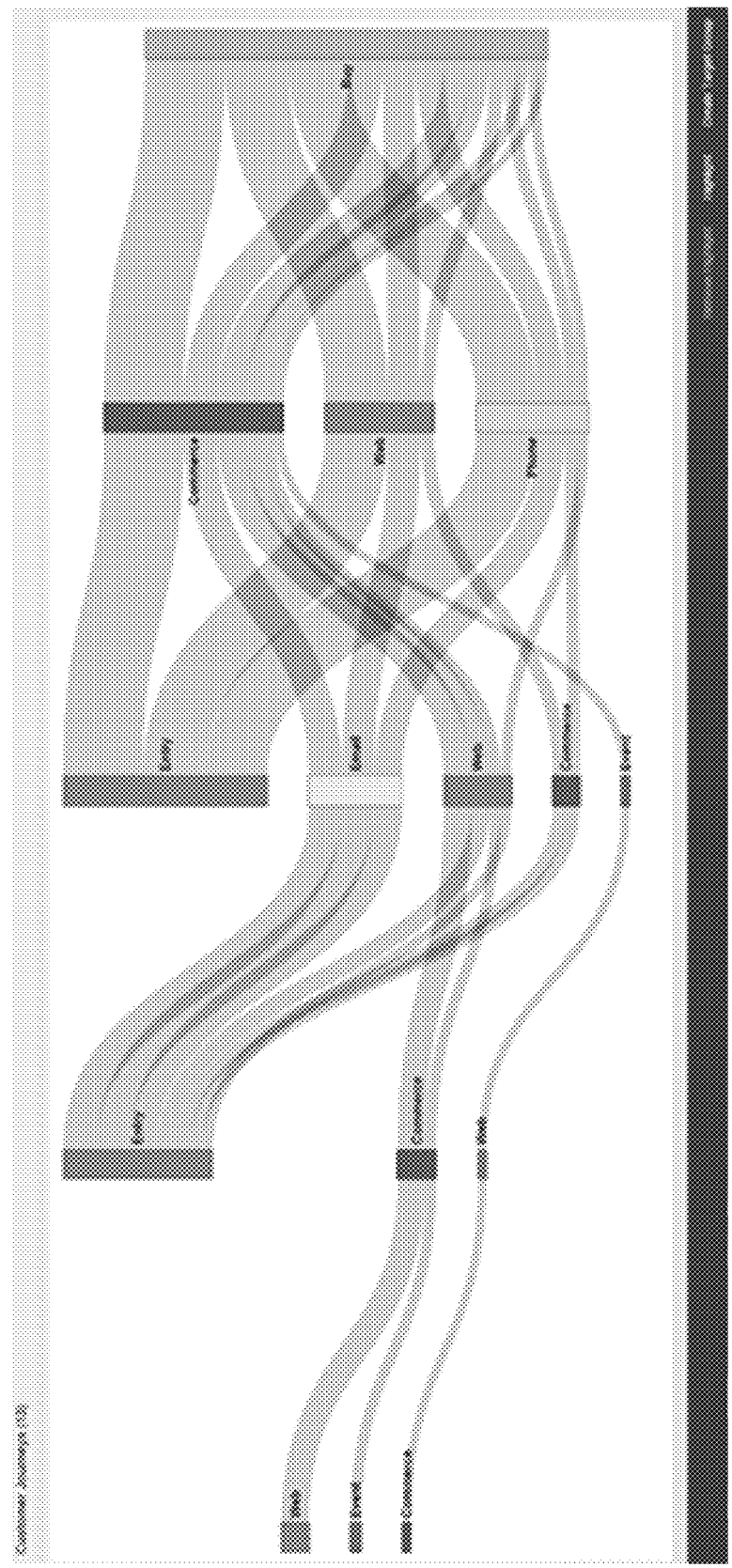
FIG. 28 is a Sankey diagram with a wide range of path flow variation, according to an exemplary embodiment.

Referring now to FIG. 28, a Sankey diagram 2800 is shown with a wide range of path flow variation, according to an embodiment. The various events, and then the particular paths proceeding through those events, have been arranged vertically in decreasing order. Thus, the most popular events and paths are at the top of the diagram, while the least popular events and paths are more toward the bottom of the diagram. It is not uncommon for there to be many events and paths that are very thinly populated. Such "thin" paths may distract a user who is interested in a broad overview of more popular paths. Conversely, such thin paths may be of particular interest to a user who might want to design a business action to handle them for example.

Figure 29:
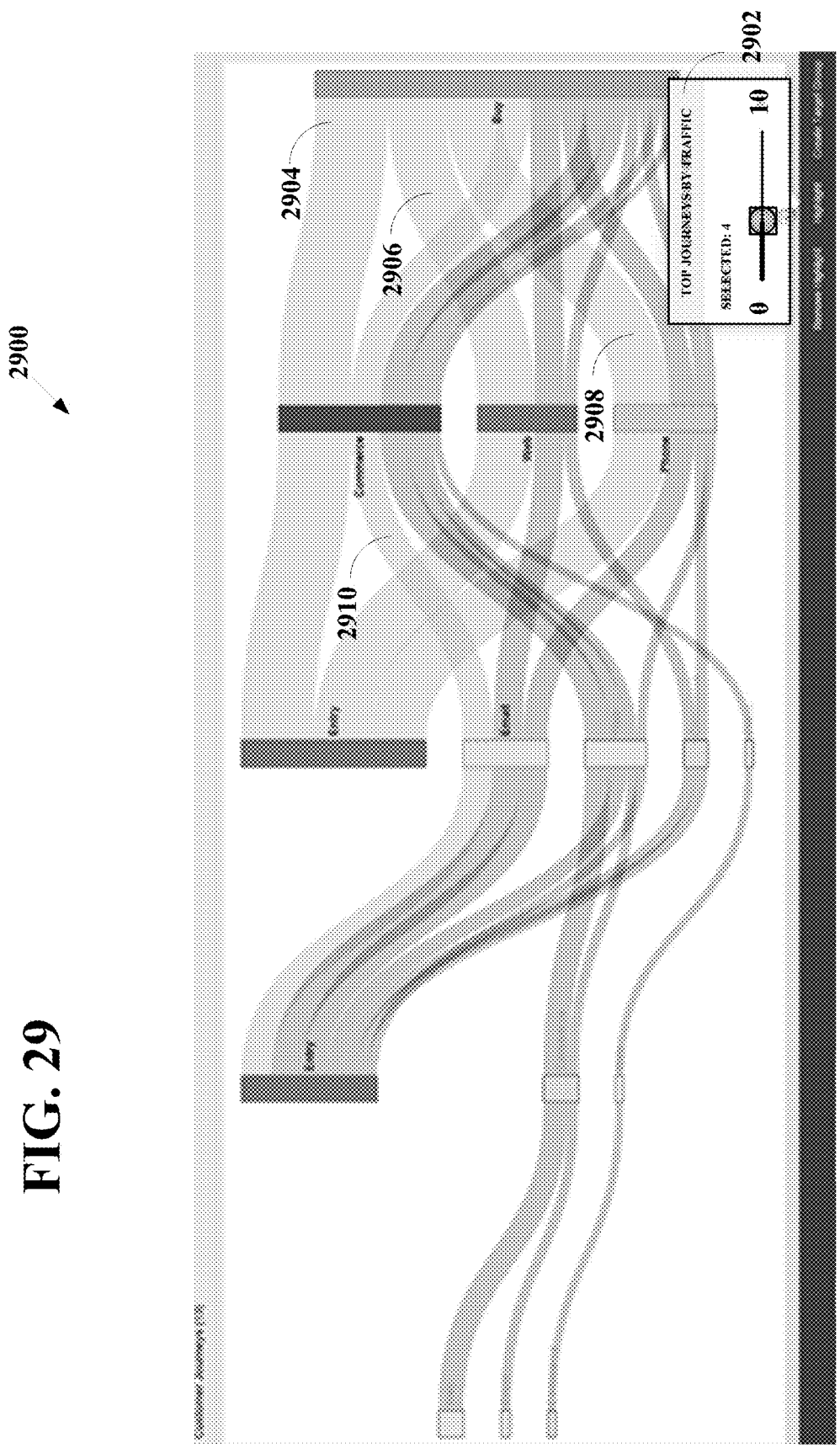
FIG. 29 is a Sankey diagram with a dynamic path selection mechanism, according to an exemplary embodiment.

Referring now to FIG. 29, a Sankey diagram 2900 is shown with a dynamic path selection mechanism, according to an embodiment. The path selection mechanism may for example comprise a pop-up window 2902 that appears when invoked by a user. The pop-up window may contain a slider bar or other graphical user interface device that enables a user to select a value from a range of values. In one embodiment, the range of values may represent the total number of contact journeys represented in the Sankey diagram 2900, expressed in a percentage.

As the user moves the slider bar from zero toward 100, those paths in the Sankey diagram 2900 having less than the designated percentage may be made visually less distinctive than those paths having more than the designated percentage. For example, those paths in the Sankey diagram 2900 having less than the designated percentage of the total may be grayed out or simply dynamically removed from the depiction entirely. Similarly, those paths in the Sankey diagram 2900 having more than the designated percentage of the total may be highlighted in a distinctive color or color pattern as previously described.

In this example, popular paths 2904-2910 each comprise a higher path quantity than the quantity limit specified by the user interaction with the slider, and so may be made visually more distinctive. The quantity limit specified by the user may refer to a cutoff point for each path, or may refer to a cumulative quantity for all paths. Thus, a user may easily visualize those individual paths with sufficient flow to be of interest, or may visualize those paths that together (from highest to lowest) have sufficient flow to be of interest.

Figure 30:
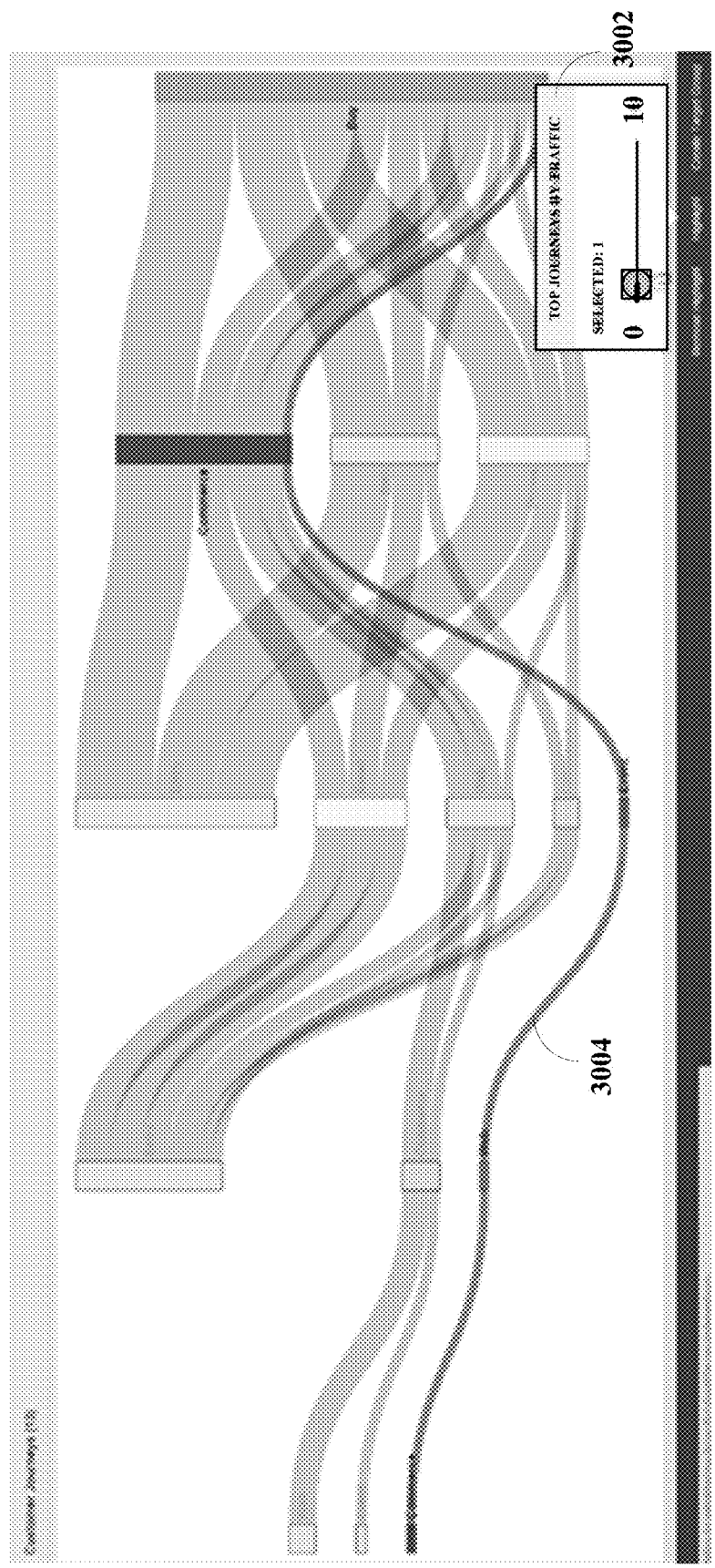
FIG. 30 is a Sankey diagram with an alternate dynamic path selection mechanism, according to an exemplary embodiment.

Referring now to FIG. 30, a Sankey diagram 3000 is shown with an alternate dynamic path selection mechanism, according to an embodiment. The path selection mechanism may again comprise a pop-up window 3002 that appears when invoked by a user, with a slider bar or other graphical user interface device that enables a user to select a value from a range of values. In this embodiment, however, the user may choose to selectively highlight paths that represent less than a specified number or percentage of the total contact journeys. More popular paths may remain grayed out or may be deleted from the Sankey diagram 3000 altogether.

Thus, as the user moves the slider bar from the lower point in the range of values toward the higher point in the range of values, an increasing number of the narrowest paths may be made more visually distinctive. A user may therefore easily visualize those individual paths of relatively low flow, which may be of particular interest in some scenarios. For example, if such paths represent a failure situation of some kind, they may be of great interest even though relatively rare.

Figure 31:
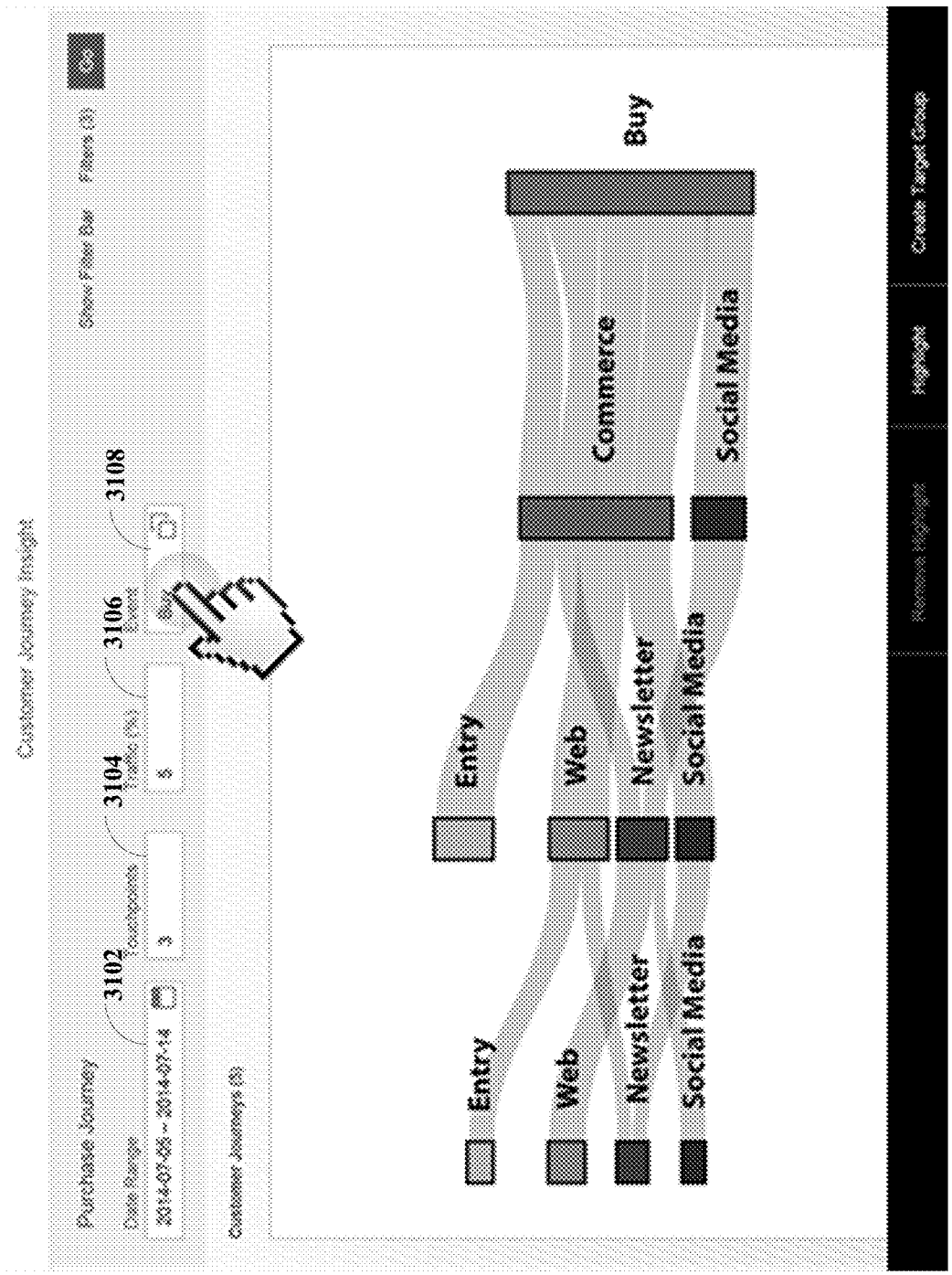
FIG. 31 is a Sankey diagram that may be assigned to a variety of selectable scenarios, according to an exemplary embodiment.

Referring now to FIG. 31, a Sankey diagram 3100 is shown that may be assigned to a variety of selectable scenarios, according to an embodiment. Many different algorithms may be used to parse, aggregate, and organize the data to be displayed in a given Sankey diagram. The choice of a specific algorithm is usually influenced by the target event (what the user wishes to see) and the context of the data. However, a user may be interested in a variety of target events and corresponding business scenarios.

Embodiments therefore may provide a framework to dynamically switch the algorithm to be used to parse the data used to render the Sankey diagram 3100. Users may therefore easily assign different algorithms to different scenarios or contexts, perhaps using data from different sources or servers. Thus, when the user selects a different scenario to explore, e.g., mobile customers who abandon many selected items placed into a shopping cart, the defined algorithm for that scenario may be executed to render the relevant output in the Sankey diagram 3100.

The embodiments may provide an infrastructure where different mining algorithms may be defined and where models may be trained to bring each algorithm to the level of development needed in a given scenario to visualize data in the Sankey diagram 3100. The embodiments may also associate or map those algorithms to the various different scenarios or business contexts to be explored. The embodiments may also provide a graphical user interface to allow a user to select a scenario and thereby also select the associated algorithm that will parse and render the resulting data into the Sankey diagram 3100.

FIG. 31 for example depicts the Sankey diagram 3100 for the context of finding insight into a contact purchase journey. A specified date range 3102, a number of events or touch points 3104 to be displayed, and a minimum traffic percentage 3106 for paths to be displayed are shown and adjustable in the graphical user interface above the Sankey diagram 3100. In response to a user command, a graphical user interface device 3108 such as a pull-down menu may also be shown, which may describe the currently selected context and other available contexts. The user may for example use the device 3108 to switch from the context of the contact purchase journey to the different scenario where the target event of interest is instead that of an abandonment of a shopping cart.

Referring now to FIG. 32, a table of scenario mapping settings 3200 is shown, according to an embodiment. The table 3200 may be read at runtime to dynamically execute the specified algorithm to parse and filter data to be rendered in a Sankey diagram for various scenarios that may be selected by a user. For example, for the business context of Sales, the scenario of most interest for depiction is that of revenue versus web navigation paths that may lead to the sale. Data for such paths may be stored in server 1, and an associated data model or algorithm named GILG_02 may be associated with that data. The model may for example predict future sales based on historical data and on the buying propensity of a particular contact population.

A different business context, Loyalty, may be associated with the scenario of customers who churn, e.g. select an item for purchase by placing it into a shopping cart, but then delete such items or abandon them rather than purchase them. Data for such paths may be stored in servers 1 and 2, and an associated data model or algorithm named C-SPADE may provide insight into this contact population. Any number of contexts or scenarios may have data sources and models associated. Exemplary contexts include for example Customer Journey, Loyalty, and Sales, and the corresponding business scenarios may include for example Age, Buy, Customers That Churn, Buying Propensity, and Revenue Versus Web Navigation Paths, though many others may also exist.

The result may be that a user may create an "album" or portfolio of scenarios available for exploration of depicted contact journey data. Such an album may be part of a commonly used set of tools to explore and investigate the interaction habits of many different contact populations. Specific business actions may be planned according to the different scenarios and corresponding contact interaction data that may be quickly summarized and described by such an album. For example, as social media sites become more popular, a marketing analyst may specialize in helping clients best take advantage of this trend by redesigning their marketing strategies. Such a user may choose to show a series of success stories, each comprising a number of measures resulting from corresponding changes to marketing strategies, from the album.

In general, a framework for selecting a given context or scenario to be explored and displayed may define a new model to train, assign an algorithm to the model, and map the algorithm and model to the context or scenario. An end user may then load the graphical user interface and select a scenario of interest. The embodiments may then retrieve and execute the mapped algorithm associated to the scenario selected in the graphical user interface. The embodiments may then return the associated data and render a Sankey diagram for display. There is currently no infrastructure in available marketing tools that enables such selection of different scenarios and different algorithms for Sankey diagram depiction.

Figure 33:
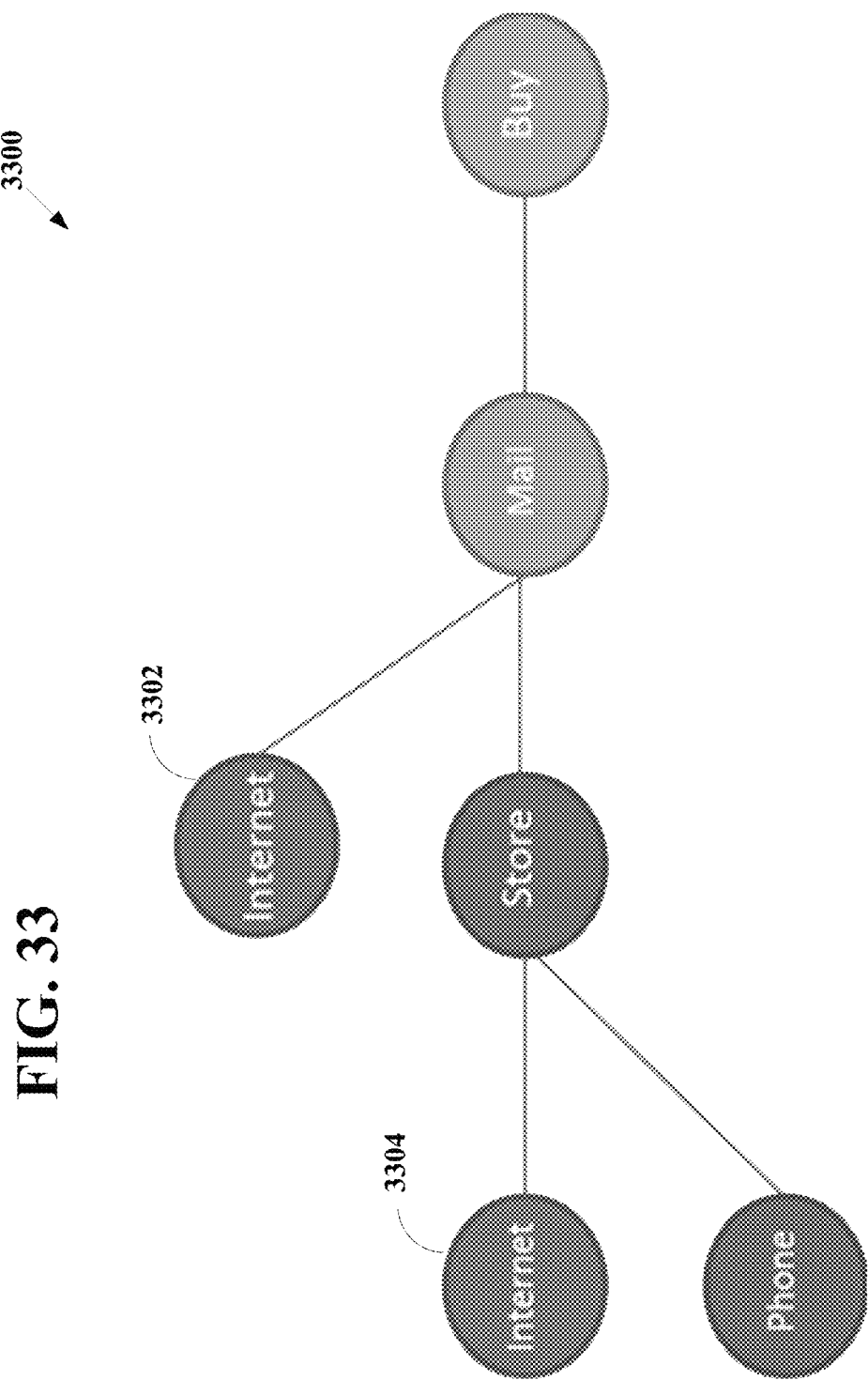
FIG. 33 is a simplified Sankey diagram, according to an exemplary embodiment.

Referring now to FIG. 33, a simplified Sankey diagram 3300 is shown, according to an embodiment. Sankey diagrams may represent the flow of information, as represented by event nodes and interconnecting lines. However, deriving useful insights from Sankey diagrams is not always easy, especially if they depict a large quantity of data and are complex.

Embodiments therefore may color Sankey diagrams with a coloring algorithm that reduces Sankey diagram complexity and enhances diagram readability. The algorithm may color Sankey diagram nodes and/or paths by following specified rules, e.g., rules related to a business scenario. For example, a user may specify that all successful scenarios may be depicted in a first color, and that all failing scenarios may be depicted in a second color.

In FIG. 33, no business rules have been specified yet, but embodiments may nonetheless customize the Sankey diagram 3300 somewhat. For example, the coloring algorithm may review the contact data and ensure that only one color is assigned to each node representing a given event type. For example, there are two Internet channel nodes depicted, one (item 3302) as a third step away from a purchase, and another one (item 3304) as a fourth step away from a purchase. The algorithm may depict each one of these nodes using a selected color, e.g., blue. Each other node represents a different given node type and may be depicted using a different color. Although this is a very simple coloring scheme, it will greatly assist a user who is trying to derive some useful insights from a potentially very complex Sankey diagram.

Figure 34:
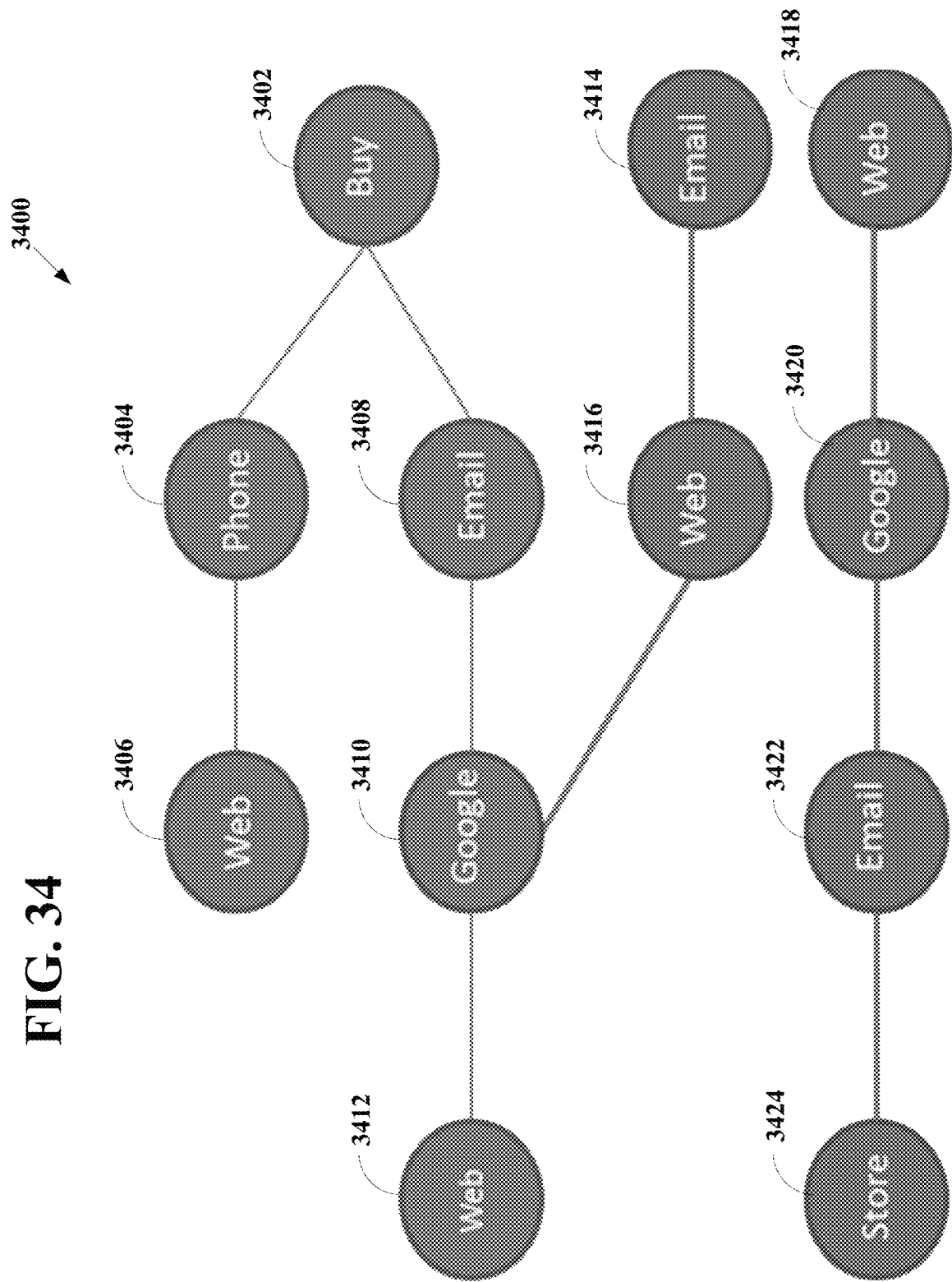
FIG. 34 is a simplified Sankey diagram with nodes and paths colored dynamically based on a context, according to an exemplary embodiment.

Referring now to FIG. 34, a simplified Sankey diagram 3400 is shown with nodes and paths colored dynamically based on a context, according to an embodiment. In this example, a user may specify rules for customizing the diagram based on whether an end node represents a successful purchase event or not. All successful purchase events may comprise a Buy type contact interaction for example, and may be colored blue according to the specified rules. All non-Buy type contact interactions may be defined as unsuccessful and may be colored red per the rules, for example.

With the input data comprising the interaction sequences of Web-Phone-Buy, Web-Google-Email-Buy, Google-Web-Email, and Store-Email-Google-Web, the embodiment may identify two successful scenarios and two unsuccessful scenarios. The embodiment may then depict all the nodes and paths for the successful scenarios in blue, and all the nodes and paths for the failing scenarios in red. In this example, nodes 3402-3412 may be colored blue, while nodes 3414-3424 may be colored red.

Similarly, the paths between nodes 3402-3412 may be colored blue, while the paths between nodes 3414-3424 may be colored red. The path between nodes 3410 and 3416 may be colored red. Node 3410 is common to both successful and unsuccessful scenarios, and may be colored in both red and blue, which may be shown as a red border around an otherwise blue node for example.

Figure 35:
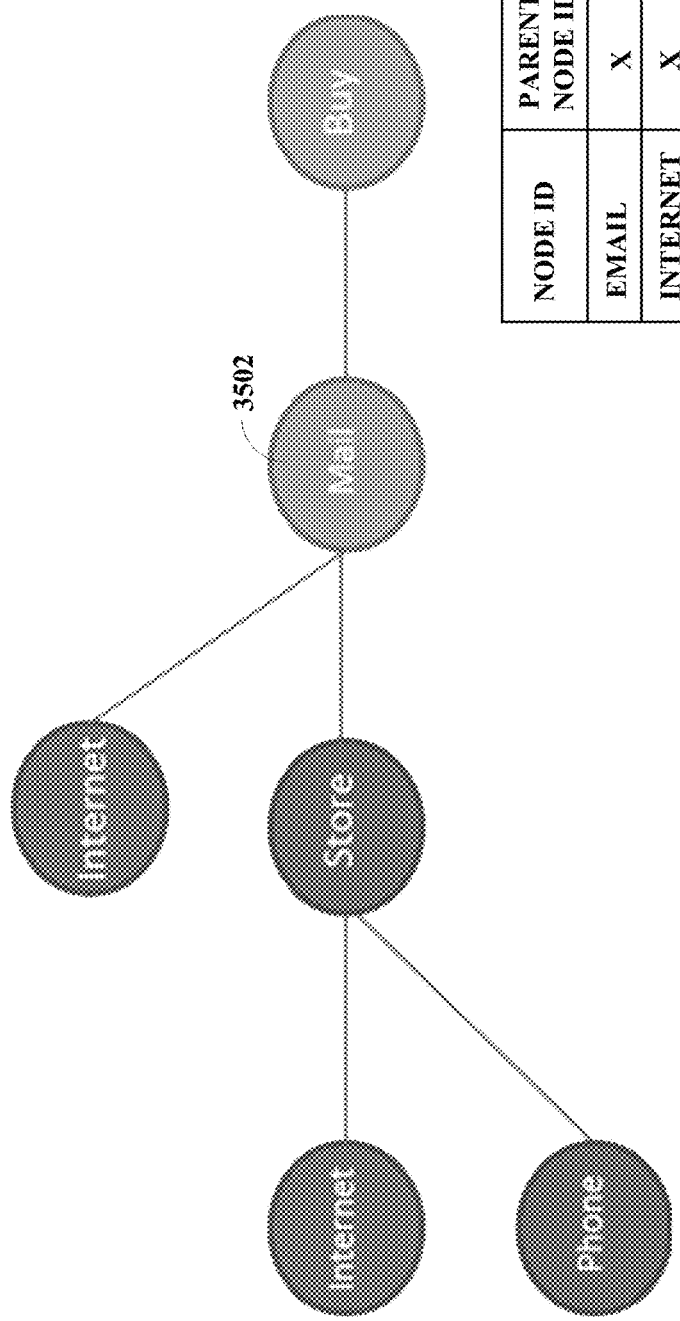
FIG. 35 is a simplified Sankey diagram with an inheritance table, according to an exemplary embodiment.

Referring now to FIG. 35, a simplified Sankey diagram 3500 with an inheritance table is shown, according to an embodiment. This figure represents the data shown in FIG. 33 where business rules have not yet been specified, but embodiments have assigned unique colors to each node representing a given event type as before. This simplified Sankey diagram 3500 may now be customized according to another embodiment.

A user may wish to "drill down" into a particular event, by for example clicking on the node representing that event. This user interaction may, in one embodiment, trigger an expansion of the clicked node so that all the children associated to it may be depicted in the Sankey diagram rendered in the graphical user interface. Each child node may be colored or otherwise depicted in a manner similar to but notably distinctive from its parent. The table in FIG. 35 may describe the coloring and parent-child relationships of the nodes in the simplified Sankey diagram 3500. The effects of selecting a particular node of interest, such as the MAIL channel event node 3502 are then shown in FIG. 36.

Figure 36:
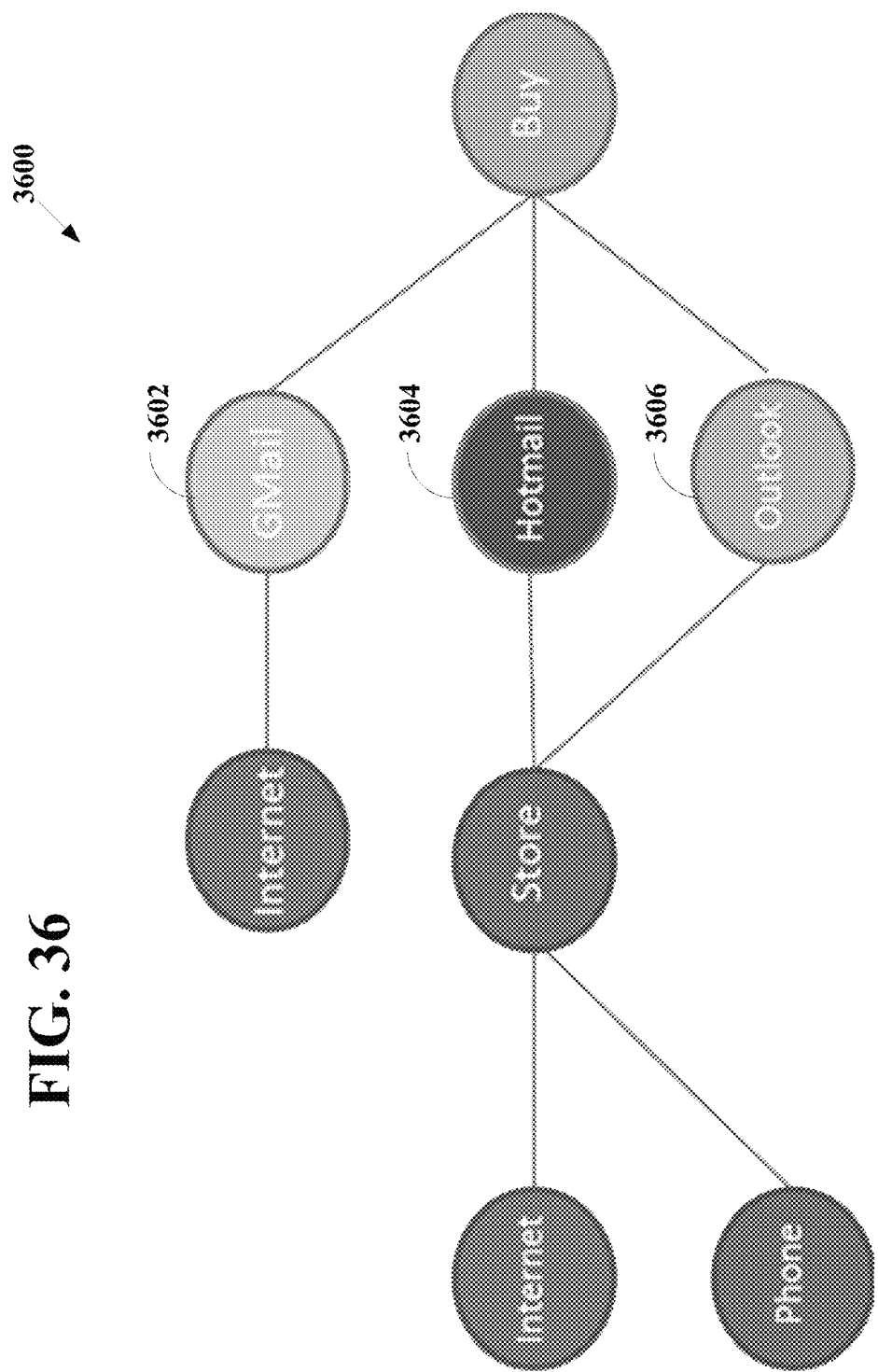
FIG. 36 is a simplified Sankey diagram with expanded child nodes, according to an exemplary embodiment.

Referring now to FIG. 36, a simplified Sankey diagram 3600 is shown with expanded child nodes, according to an embodiment. This diagram may result from a user for example double-clicking on a selected parent node. Embodiments may help the user drill down into the information encapsulated in the parent node by expanding the Sankey diagram 3600 to show the associated child nodes. In this case, the selected MAIL channel event node 3502 of FIG. 35 has now been expanded into three child nodes. Here for example child node 3602 represents a GMail™ channel event, child node 3604 represents a Hotmail™ channel event, and child node 3606 represents an Outlook™ channel event, as denoted in the table shown in FIG. 35.

In one embodiment, each child node may be depicted in a color that is a variation of its parent node's color. For example, MAIL channel event node 3502 may have been depicted in green, while each of the child nodes 3602-3606 may be depicted in a different shade or variation of green. Contextual coloring of nodes may greatly aid a user in comprehending a depicted Sankey diagram. Although the operation of the embodiments is described here in terms of color, any other visual indicia as previously described may be applied as well.

Figure 37:
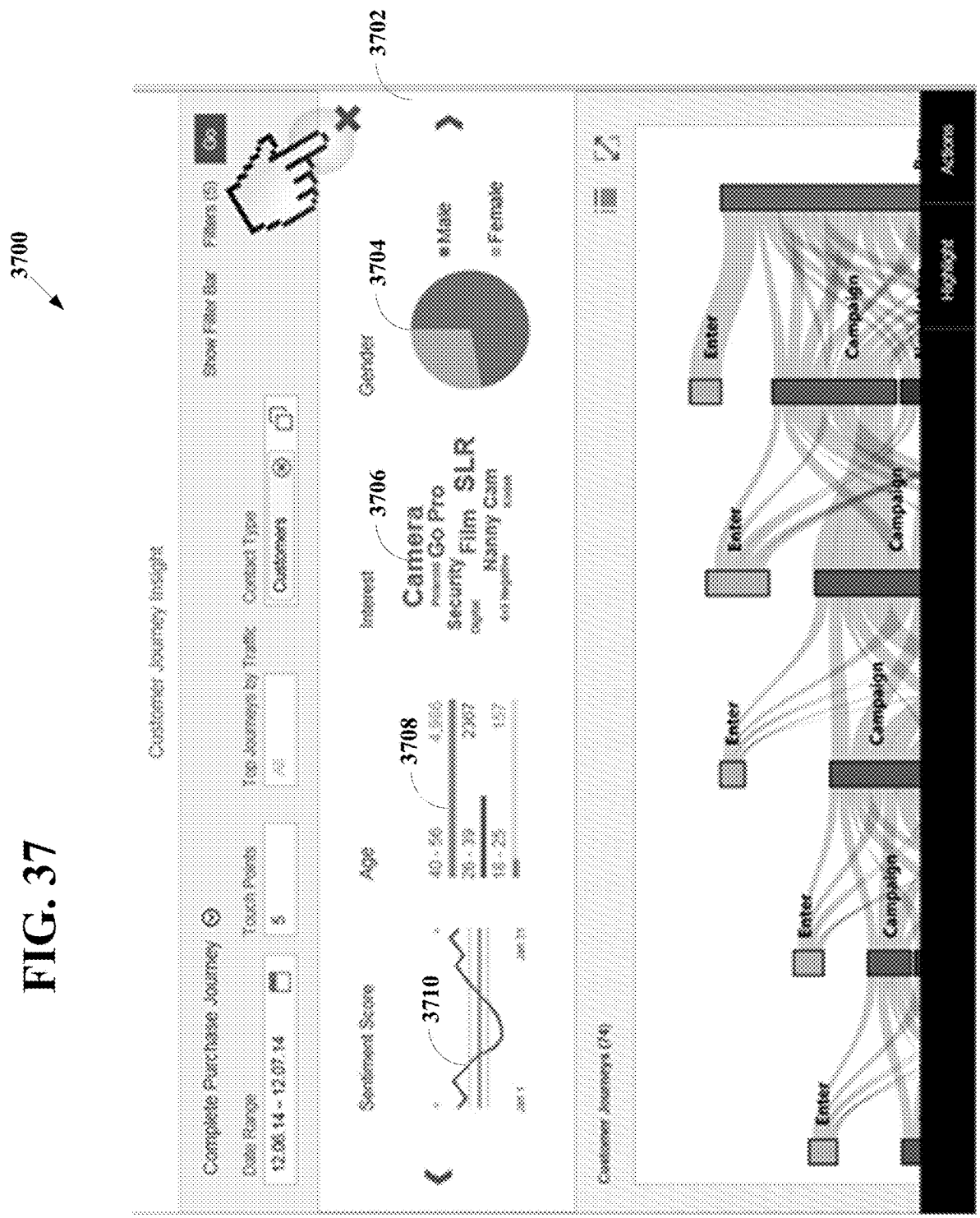
FIG. 37 is a Sankey diagram with additional contextual statistical data, according to an exemplary embodiment.

Referring now to FIG. 37, a Sankey diagram 3700 with additional contextual statistical data is shown, according to an embodiment. Conventional Sankey diagrams do not provide much insight on collateral data that is related to the event sequences typically depicted. There is currently no known method to extend a classic Sankey diagram by integrating more elaborate data.

Embodiments therefore are now provided to enable a user to customize the Sankey diagram 3700 depicted in a graphical user interface to provide related contextual statistical data. FIG. 37 provides not only the Sankey diagram and filter bar features as previously described, but also shows a user-selectable collateral data area 3702. This secondary portion of the graphical user interface may provide a scrollable set of panels where contextual data related to the contacts making the various diagrammed journeys may be shown.

For example, a pie chart 3704 may be displayed to denote information regarding the gender distribution of a contact population. A word size speckle or cloud diagram 3706 may depict words describing exemplary product features of interest to the contact population, with font size denoting a relative interest level. Word speckle diagrams may be related to search terms provided by a customer population, or terms appearing most often in documents viewed by contacts.

A bar chart 3708 may depict an age distribution of the contact population, or other demographic information. A graph 3710 may depict for example a sentiment score for the contact population over some time span. Sentiment scores may reflect for example a level of customer satisfaction or general demeanor of a visiting potential customer toward a business enterprise. Sentiment scores may also denote the attitude of a contact population toward a given product or shopping experience, and may be of great marketing interest.

Figure 38:
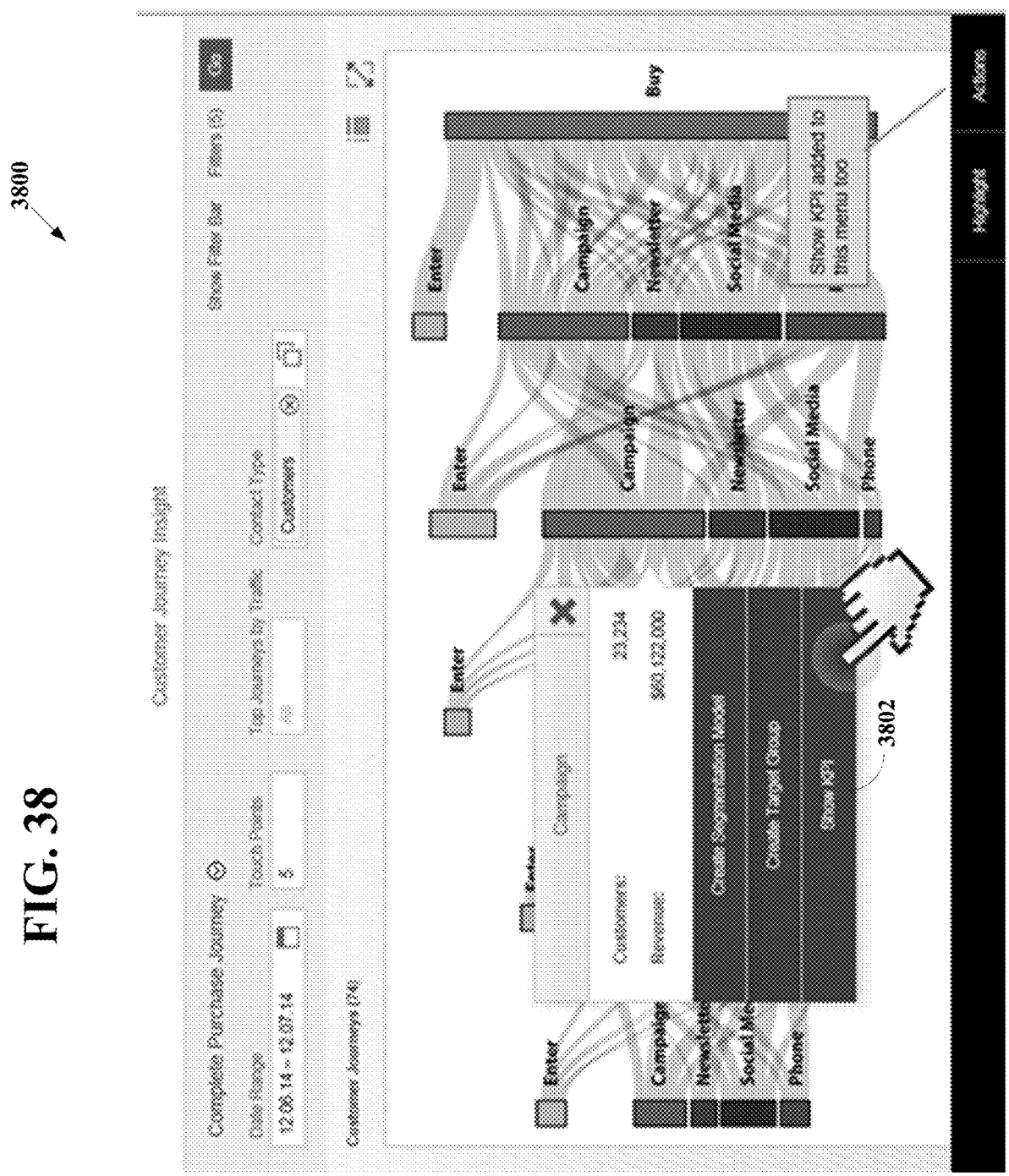
FIG. 38 is a Sankey diagram with additional contextual statistical data in a dialog box overlay, according to an exemplary embodiment.

Referring now to FIG. 38, a Sankey diagram 3800 with additional contextual statistical data in a dialog box overlay is shown, according to an embodiment. In this embodiment, a customer may click on a given path or event node in the Sankey diagram 3800 or otherwise trigger the depiction of a dialog box 3802. The dialog box 3802 may provide details about the clicked item, for example to show information about the key persons of influence making the contact interaction journeys through or along the selected Sankey diagram item.

The total number of contacts may be provided, along with the revenue resulting from the subset of the contact population related to the selected item for example. A user may also selectively create a segmentation model or a target group to track this population subset, or may show a list of the actual contacts themselves. The information gathered about a target population may be the basis for a business action such as a promotional campaign that was taken or may be taken in the future.

Figure 39:
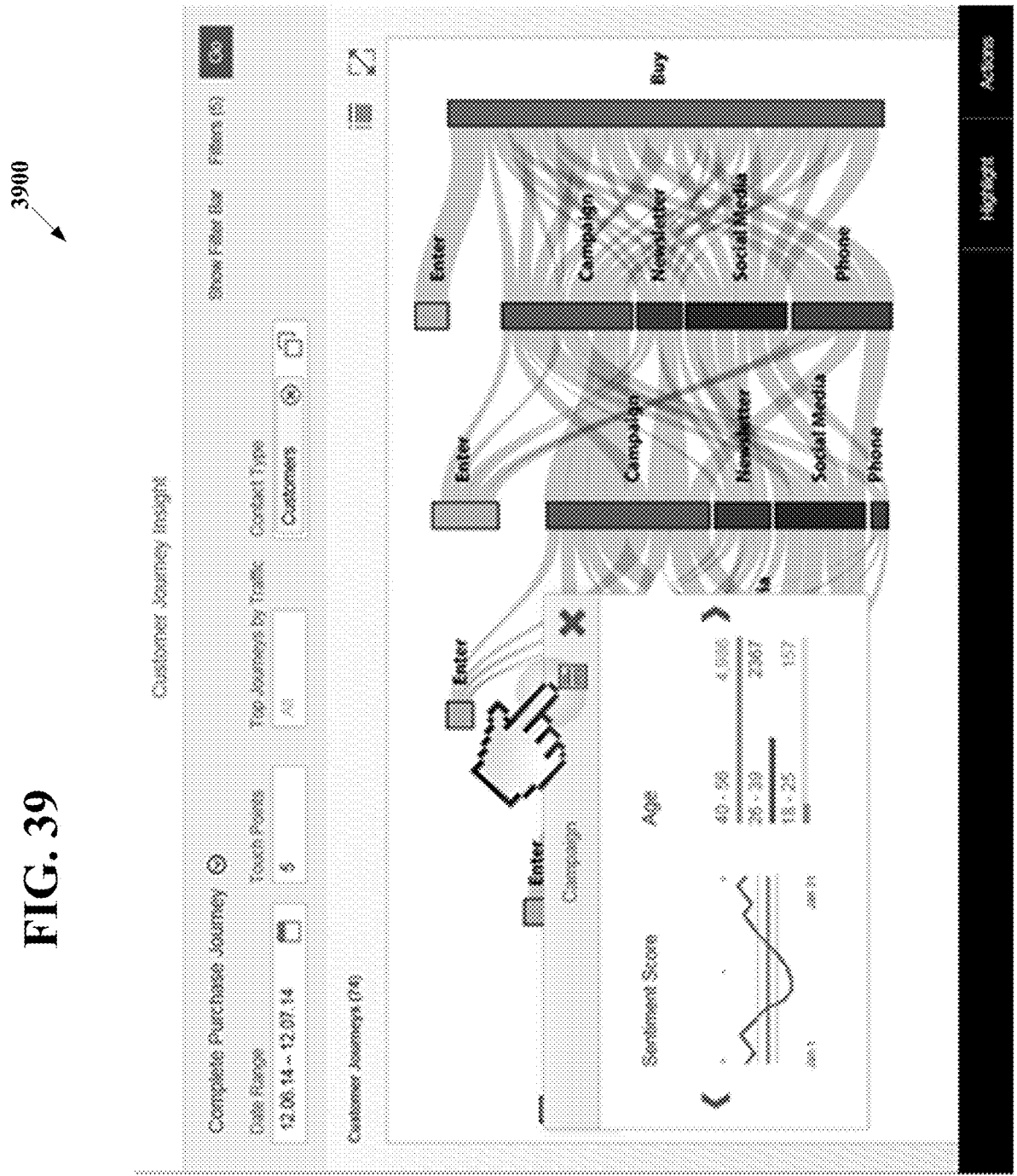
FIG. 39 is a Sankey diagram with further contextual statistical data in a dialog box overlay, according to an exemplary embodiment.

Referring now to FIG. 39, a Sankey diagram 3900 with further contextual statistical data in a dialog box overlay is shown, according to an embodiment. As with FIG. 37, embodiments may provide a scrollable set of panels where contextual data related to the contacts making the various diagrammed journeys may be shown. In this embodiment however, the data may be provided in the dialog box overlay as in the case of FIG. 38.

Referring now to FIG. 40, a table of customization settings 4000 is shown, according to an embodiment. This table may show how various user interactions in various business contexts may render particular charts that provide additional contextual data. The particular data to be depicted, and the position of the charts in the graphical user interface (e.g., either in a secondary data portion of the graphical user interface or in a dialog box overlay) may be specified. The table thus defines the association between a chart and corresponding data with the business context and Sankey diagram customization actions.

Embodiments may render all the charts to be depicted in the secondary data portion above the "top" of the Sankey diagram as in FIG. 37 by running the queries associated with the data asynchronously, and pushing the results to the graphical user interface for rendering the associated charts. For charts to be depicted in a dialog box overlay as in FIGS. 38 and 39, the associated charts may be loaded into the dialog box overlay in response to a user click or other trigger command. The embodiments may determine the clicked Sankey diagram item (e.g., an event node or a path), and retrieve all accounts associated with the clicked item. Embodiments may then run queries associated with the data, as defined in the table of customization settings 4000 for the retrieved accounts, and again push the results to the graphical user interface for rendering the associated charts in the dialog box overlay.

Figure 41:
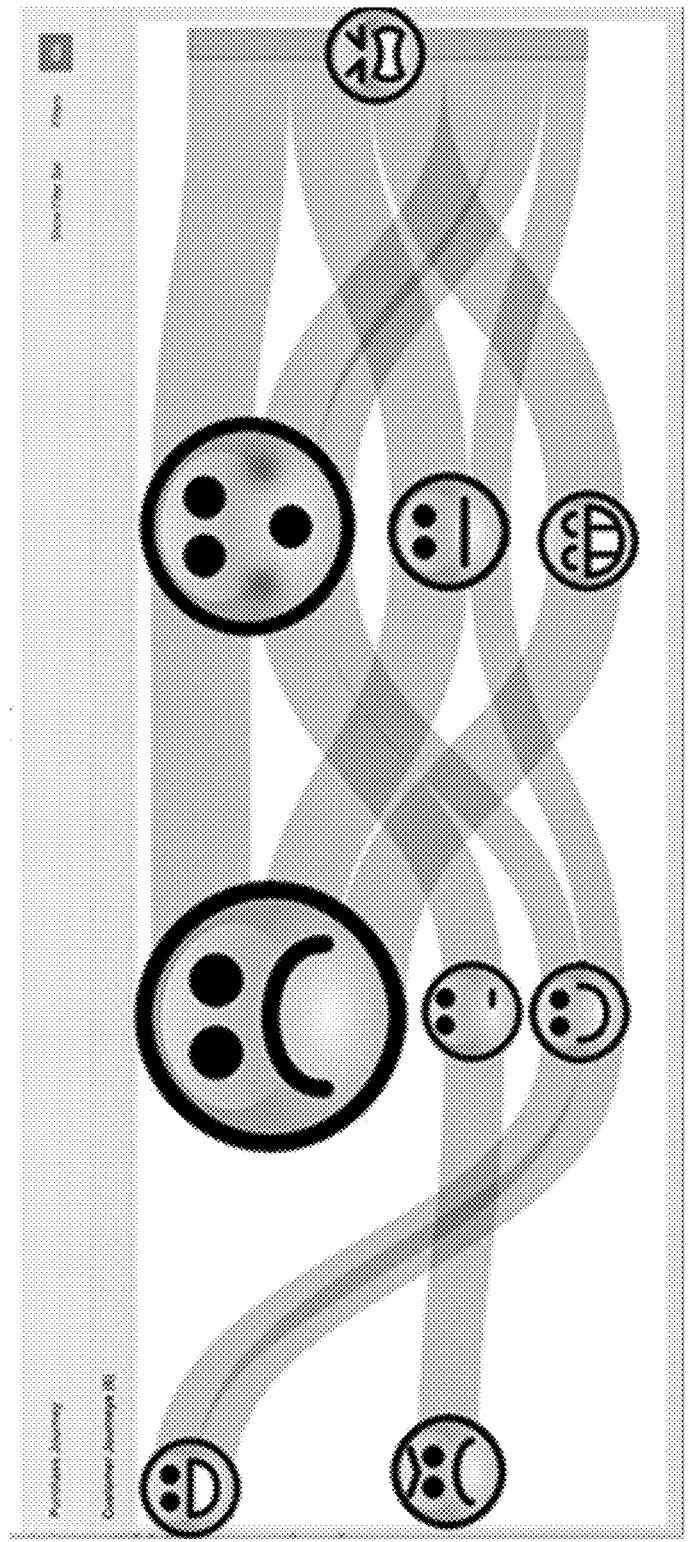
FIG. 41 is a Sankey diagram representing sentiments and emotions, according to an exemplary embodiment.

Referring now to FIG. 41, a Sankey diagram 4100 representing sentiments and emotions is shown, according to an embodiment. Contact sentiment is a measure of the mental states experienced over time by a person while undergoing a given interaction journey. Sentiment scores may be determined via surveys, questionnaires, reviews, and other forms of feedback that may be available for a person to convey their attitudes to a business enterprise. Sentiment is known to change rapidly for example when a customer is frustrated or disappointed at some aspect of their interactive experience. Final sentiment values at a target event and intermediate sentiment values during the journey, e.g., before and after various interactions, are thus often of great interest to marketing analysts.

In one embodiment, sentiment may be associated with a plurality of non-alphanumeric visual indicia, such as pictorial representations or visual graphics that may be displayed in response to a user customization of the Sankey diagram 4100. The pictorial representations may include emotional icons or "emoticons", which are symbolic facial diagrams intended to immediately convey a recognizable mental state to a viewer. Mental states to be conveyed may include happiness, unhappiness, surprise, confusion, and frustration for example, and each may have some relative intensity associated therewith. These states may be tracked over a period of time for all contacts, or for a particular chain of events, e.g., a path, of interest.

Embodiments may communicate contact sentiment at some or all of the events of the Sankey diagram 4100 by for example placing an associated emoticon over the nodes corresponding to the events where contact sentiment is known. A user may thus immediately determine the sentiment flow among contacts depicted in the Sankey diagram 4100. This approach retains the correspondence between path quantities and node size as previously described, and helps to denote the number of contacts experiencing the depicted sentiment.

A market analyst may thus determine which contact populations are experiencing which mental states at different portions of their journeys. These states may reflect contact attitudes toward or views of a product or brand as well as the various interaction processes they experience. A business enterprise may base its future business actions on adjusting contact sentiment to improve contact satisfaction with all aspects of their interactions with the business enterprise. Such business actions could include for example gathering more sentiment data from more contacts, identifying troublesome aspects of the business operations that may require corrective action, and determining the effectiveness of historical or predictive future business actions on modifying contact sentiment.

Embodiments may enable a user to analyze sentiment data from one Sankey diagram in another Sankey diagram. For example, a user may select an event to analyze, e.g., a potential customer got angry during a phone conversation. The embodiments may then review the past several different events that led to the same sentiment for some or all of the customers or potential customers, to determine what interactions cause customer anger. The user may direct the embodiments to retrieve the sentiment values for those angry customers at the time each of those individual events occurred, and count the number of recurrences of the adverse sentiment. The user may then order all the sentiment data and render it in another Sankey diagram, using the sentiment recurrence count to determine the depicted width of the various sentiment states.

Figure 42:
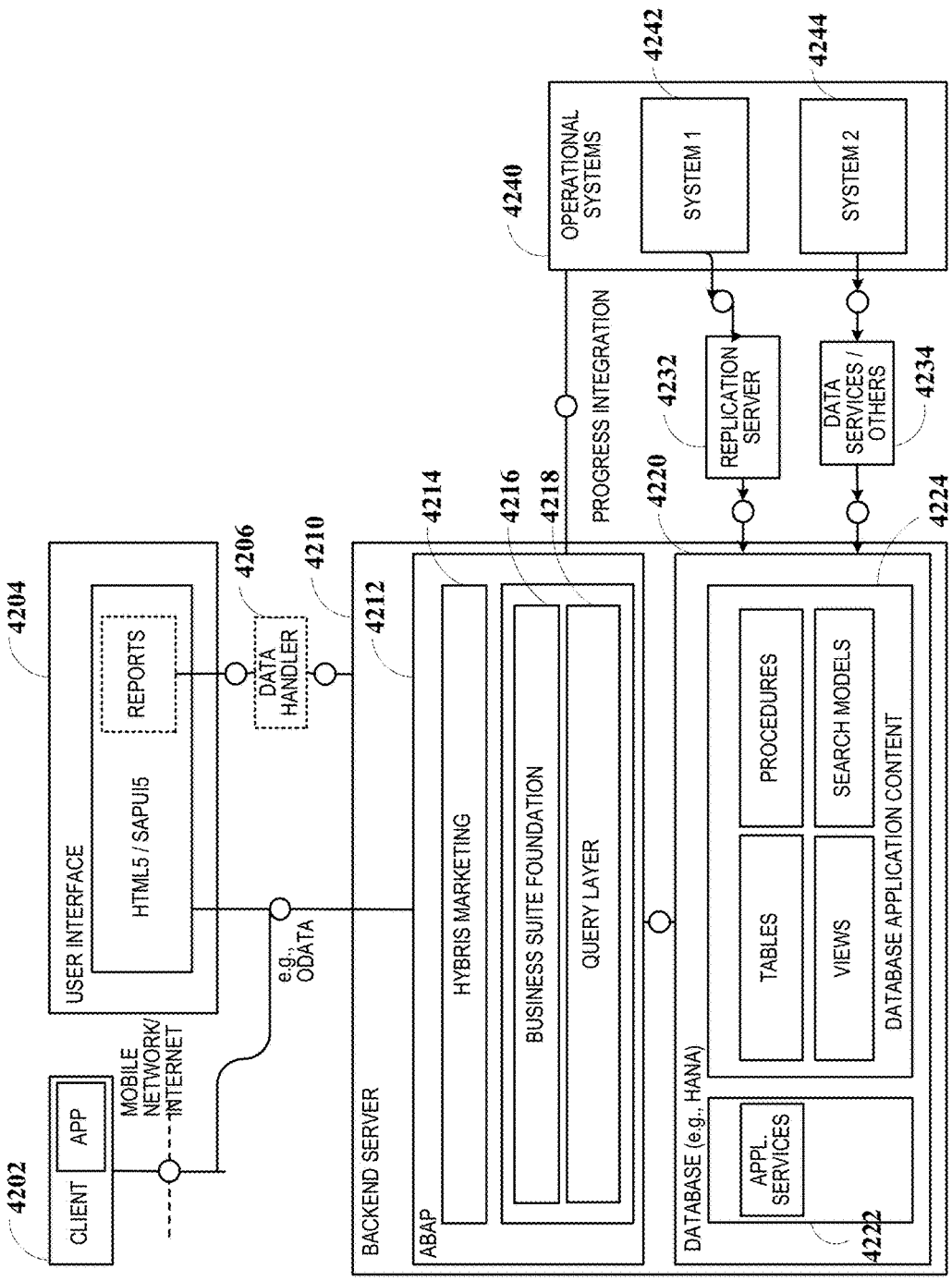
FIG. 42 is a diagram of a networked system suitable for use with embodiments of the present disclosure.

Referring now to FIG. 42, an architectural overview is shown of a networked system 4200 suitable for use with embodiments of the present disclosure. As shown in FIG. 42, the networked system 4200 includes client device 4202, user interface server 4204, and backend server 4210.

The networked system 4200 may include one or more client devices 4202, being network accessible via an Internet connection, and connected to a user interface server 4204 and a backend server 4210. Client device 4202 may include a variety of devices such as, for example, a mobile device (e.g., a mobile phone or smartphone), a personal computer, a laptop, a tablet, and the like. In addition, client device 4202 may host one or more client applications, such as a client journey application.

A client journey application may mine large amounts of contact interaction data stored within data sources 4220 of backend server 4210. The client journey application may utilize such contact interaction data to provide and graphically render trends in contact interactions for a respective business product according to the methods described herein. For example, when many contacts buy a product, the client journey application may graphically render various channels (also referred to as paths or links) that customers traverse to purchase a given product. The various purchasing channels and their respective frequencies (e.g., a frequency of use) may be mined from data sources 4220, and graphically rendered by a client device 4202 of networked system 4200.

Client device 4202 and user interface server 4204 may be configured to exchange data with an enterprise data system, such as a backend server 4210. In addition, user interface server 4204 may instruct client device 4202 to generate and render user interfaces and/or reports based upon the exchanged data. User interface server 4204 may utilize a variety of interfaced technologies. Some example interface technologies include HTML5, SAP® UI5, SAP®-WebDynpro, SAP® Gui, Perl, and the like. In addition, the user interface technology may operate in conjunction with business object platforms for visualizing business objects, such as SAP® Business Object Platform (SBOP), SAP® Business Intelligence Platform (SBIP), and the like.

User interface server 4204 may generate interface code at runtime. However, depending on the interface technology, some embodiments may implement functions of the user interface server 4204 on the client-side. For example, functions of the user interface server 4204 may be implemented at the client device 4202 on a browser using HTML5, javascript, CSS, or on a device using ObjectiveC. Thus, in some implementations, implementation of user interface server 4204 may be optional.

The backend server 4210 may be configured to process request(s), retrieve data, and/or perform data operations as an appropriate response to a request, and return a response for transmission back to the client device 4202 or user interface server 4204. In the example configuration depicted in FIG. 42, the backend server 4210 may include one or more advanced business application programming (ABAP) modules 4212, such as marketing module 4214, which may be a hybris® marketing module. For example, hybris marketing module 4214 may be configured to track and store user interactions, such as user shopping history, product browsing history, purchase history, and associated product information. In some instances, hybris marketing module 4214 may be further configured to track and store a particular user's interactions across multiple devices of the user. ABAP modules 4212 may further include additional modules, such as business suite foundation module 4216 and query layer 4218 that may be configured to facilitate the exchange of data between the hybris marketing module 4214 and database 4220.

The backend server 4210 may further include one or more data sources 4220. In the example depicted in FIG. 42, data source 4220 may include application support modules 4222 and database content 4224 that may include a variety of tables, views, search models, search procedures, and the like. In addition to internal data sources 4220, backend server 4210 may further be coupled to a variety of external data sources 4240. For example, external systems 4242 and 4244 may be coupled to the backend server 4210 via replication server 4232 and/or other data services 4234, respectively.

Some example external data sources may include transactional information such as contact information, sales activities, quotations, and sales orders from CRM (customer relationship management) and ERP (enterprise resource planning) systems. In some instances, the backend server 4210 may aggregate data from multiple backend servers. Within backend server 4210, a variety of data may be quickly aggregated without compromising backend or overall system performance. In some instances, various data may be represented using virtual data models (VDMs) to enable faster data aggregation. Here, a plurality of VDMs may be aggregated into fewer, or even a single VDM. Thus, aggregated data may be presented along one or more displays of a client journey application.

In addition, the backend server 4210 may be implemented by or coupled to an in-memory database. In-memory databases are located within the main memory of a computer system or a coupled device, which provides the advantage of faster data access and faster program execution. In-memory databases also enable real-time operation on a computer or device, or on multiple computers or devices communicating through wired or network connections. An example of an in-memory database is the SAP® high-performance analytic appliance (HANA®) previously mentioned. However, the embodiments are not limited to any particular in-memory database technology.

The various components networked system 4200, such as client device 4202, user interface server 4204, and backend server 4210, may be connected using known and expected network technologies, such as an Internet connection. For example, an OData connection may be used between the client device 4202 and other components, such as user interface server 4204 and backend server 4210. In another example, a data handler 4206 may be configured to exchange data between user interface server 4204 and backend server 4210. Here, the data handler 4206 may include SBOP and SBIP functions.

Figure 43A:
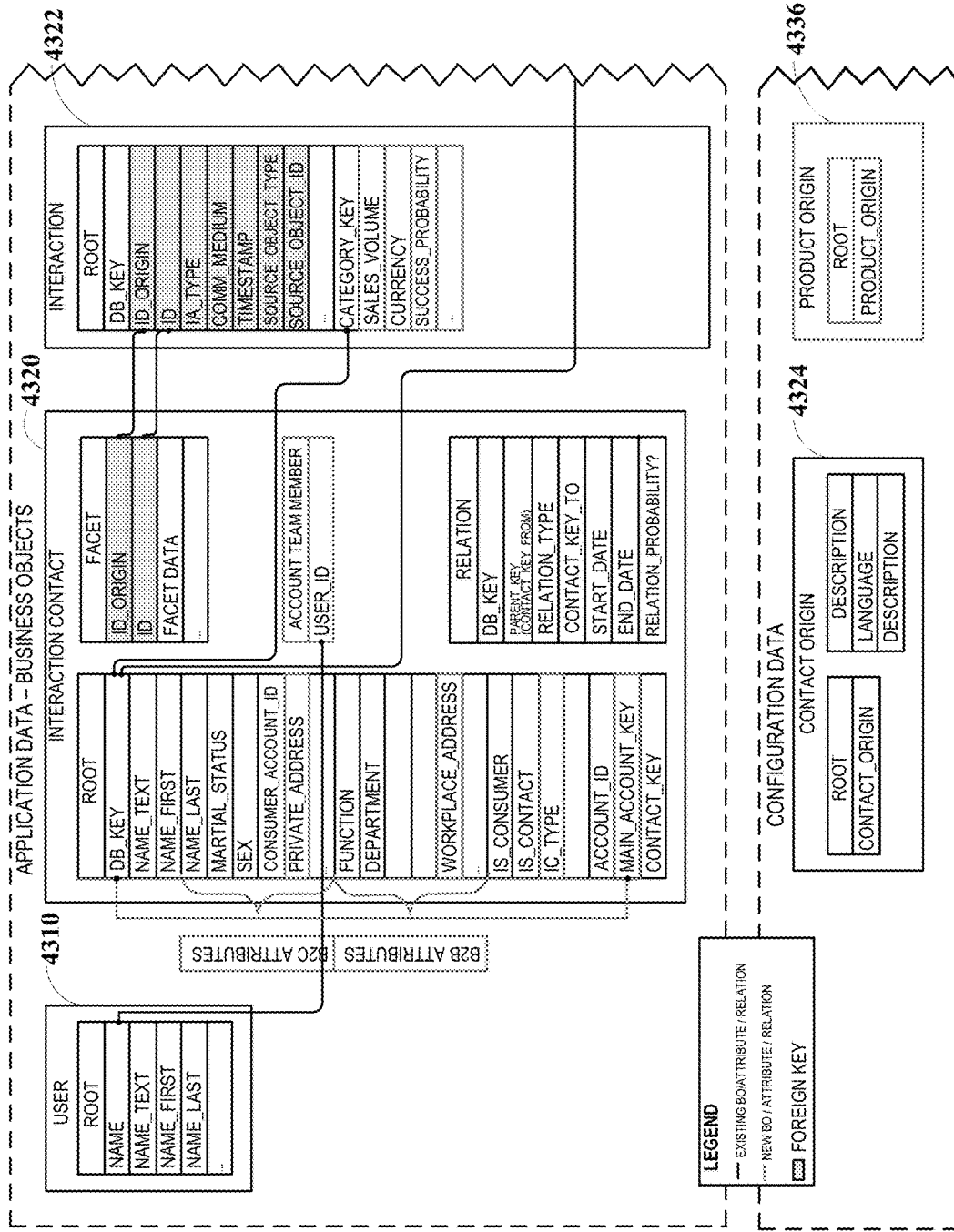
FIGS. 43A and 43B provide a block diagram of an architectural overview of a database, according to an exemplary embodiment.
Figure 43B:
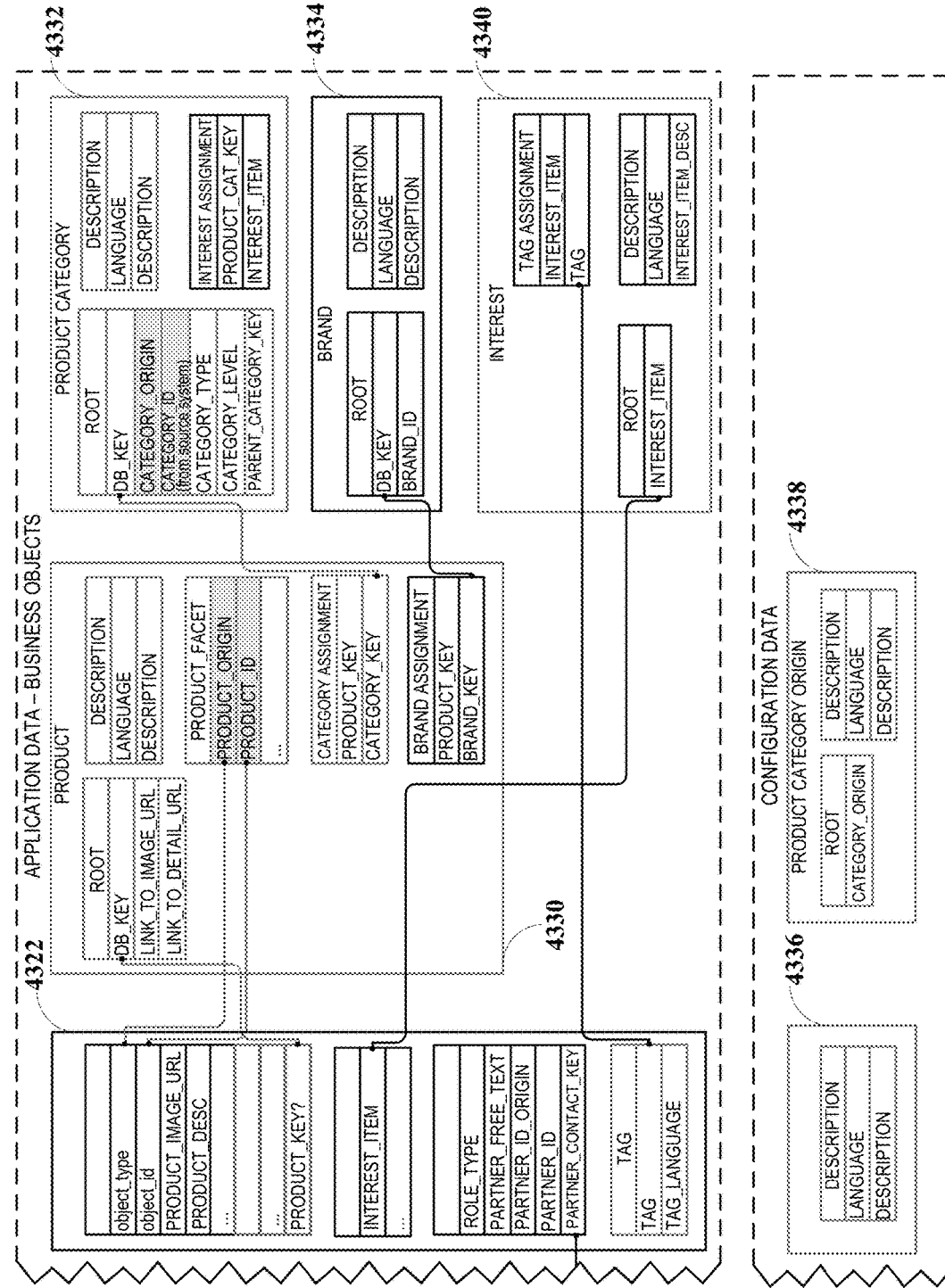

Referring now to FIGS. 43A and 43B, a block diagram depicting an architectural overview of a database 4300 is shown according to an example embodiment of the present disclosure. As shown in FIG. 43, the database includes a plurality of application and configuration data tables that may be used to track and store contact interactions (e.g., contact shopping history, product browsing history, purchase history, and associated product information). Example application data tables include user table 4310, interaction contact table 4320, interaction table 4322, product table 4330, product category table 4332, brand table 4334, and interests table 4340. In addition, example configuration tables include contact origin table 4324, product origin table 4336, and product category origin table 4338.

Figure 44:
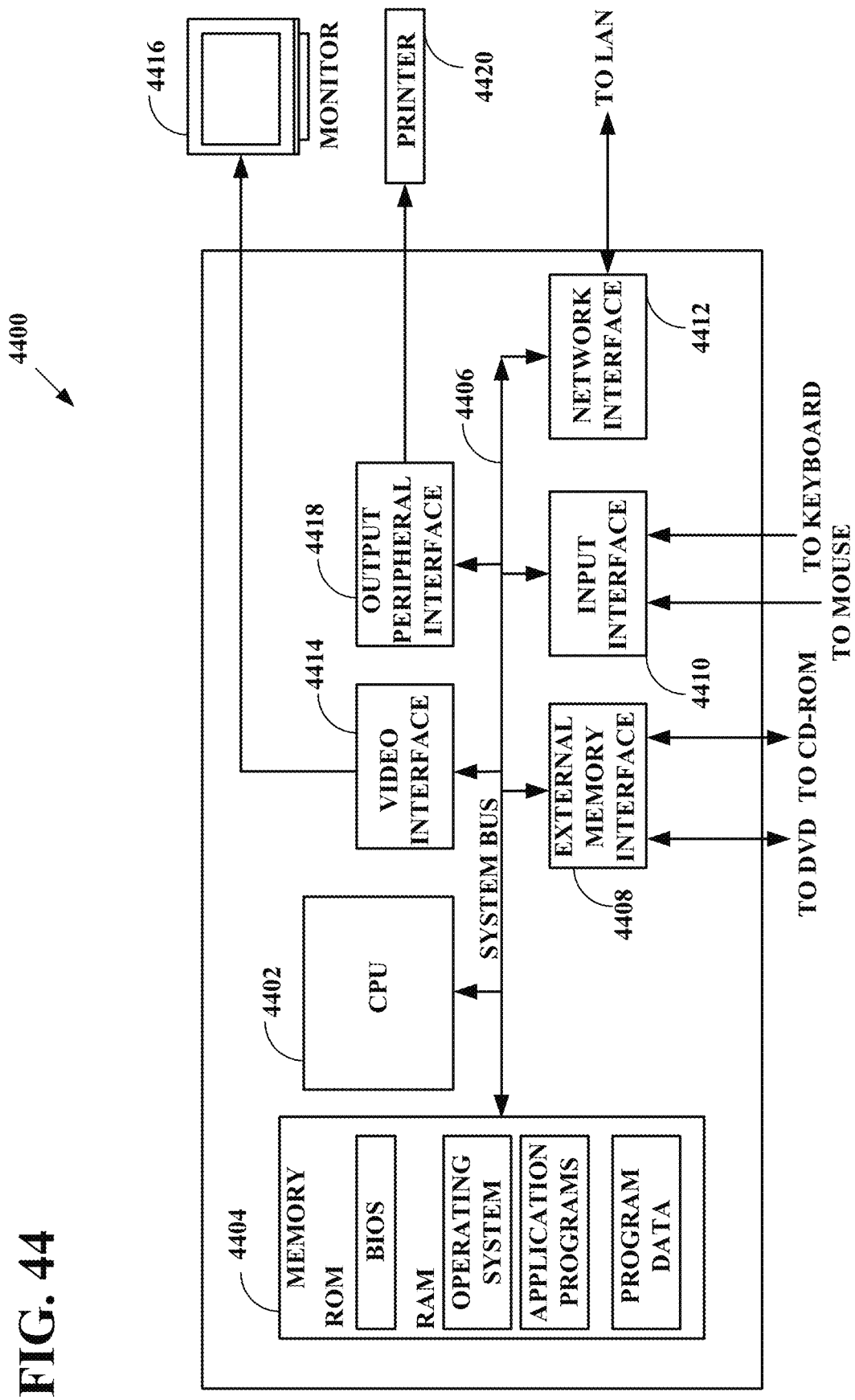
FIG. 44 is a diagram of an exemplary computer system to implement various embodiments.

Referring now to FIG. 44, a computer system 4400 is shown comprising an exemplary structure for implementation of the embodiments described above. Computer system 4400 comprises a central processing unit (CPU) or processor 4402 that processes data stored in memory 4404 exchanged via system bus 4406. Memory 4404 may include read-only memory, such as a built-in operating system, and random-access memory, which may include an operating system, application programs, and program data. Computer system 4400 may also comprise an external memory interface 4408 to exchange data with a DVD or CD-ROM for example. Further, input interface 4410 may serve to receive input from user input devices including but not limited to a keyboard, a mouse, or a touchscreen (not shown). Network interface 4412 may allow external data exchange with a local area network (LAN) or other network, including the internet. Computer system 4400 may also comprise a video interface 4414 for displaying information to a user via a monitor 4416 or a touchscreen (not shown). An output peripheral interface 4418 may output computational results and other information to optional output devices including but not limited to a printer 4420 for example via an infrared or other wireless link.

Computer system 4400 may comprise a mobile computing device such as a personal digital assistant or smartphone for example, along with software products for performing computing tasks. The computer system of FIG. 44 may for example receive program instructions, whether from existing software products or from embodiments of the present invention, via a computer program product and/or a network link to an external site.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A method for implementation by one or more data processors forming part of at least one computing device, the method comprising:
    reading and executing instructions with a processor from a non-transitory machine-readable medium to cause the processor to perform operations comprising:
        selecting and depicting information in real time using an in-memory database and a Sankey diagram in a graphical user interface, the selecting and depicting comprising:
            receiving user-generated interactions via the graphical user interface;
            determining, for each user-generated interaction, a scenario associated with such interaction; and
            querying, for each user-generated interaction, the in-memory database using a frequency mining algorithm associated with the corresponding determined scenario, the frequency mining algorithm determining a number of contacts that performed a same journey amongst various possible journeys displayed in the Sankey diagram, the querying being in the form of Structured Query Language (SQL) queries; and
        modifying the depicted information according to a user customization of the Sankey diagram, the user customization comprising: user-generated input via the graphical user interface requesting a change in visualization data for a top journeys criteria;
    wherein the requested change in visualization data is triggered by a resizing of a window on a device displaying the journey;
    wherein the requested change in visualization data is triggered by a revised entry in a top journeys criteria;
    wherein a top journeys calculation for an xth pattern is equal to $F(x): [(R(x)-1)/(N-1)]$, wherein x is a pattern number, $R(x)$ is a rank of pattern x, and N is a total number of patterns.

2. The method of claim 1 wherein the selecting further comprises:
    recognizing channel-based contact interaction sequences by data mining contact interaction frequencies; and
    aggregating the contact interaction sequences into at least one path by counting event occurrence frequencies.

3. The method of claim 2 wherein the selecting further comprises filtering input data according to at least one of:
    (a) a specified contact interaction time span and a specified number of events prior to a specified target event;
    (b) metadata that indicates associated data records, is defined by a user, and is stored in a metadata database;
    (c) a path algorithm that defines the contact interaction sequences; and
    (d) a frequency assessment algorithm that identifies the most frequently occurring event types.

4. The method of claim 2 wherein the selecting further comprises defining the paths leading to at least two specified target events, for simultaneously depicting multiple scenarios.

5. The method of claim 2 wherein the selecting further comprises at least one of:
selecting a scenario from a plurality of defined scenarios; and
selecting data mining algorithms assigned to data sources and trained models for the scenario and a context.

6. The method of claim 1 wherein the depicting further comprises ranking paths vertically by frequency order.

7. The method of claim 1 wherein the depicting further comprises providing multiple Sankey diagram nodes each representing a same interaction type occurring at a different points in contact interaction sequences.

8. The method of claim 1 wherein the depicting further comprises adding a Sankey diagram node, to depict at least one of:
(a) a path that does not include a particular event; and
(b) multiple target events.

9. The method of claim 1 wherein the depicting further comprises associating Sankey diagram path quantities with non-alphanumeric visual indicia including at least one of a color, a texture, a background image, a visual pattern, an animation, and a video.

10. The method of claim 1 wherein the depicting further comprises assigning a unique color to nodes in the Sankey diagram representing contact interaction events according to each contact interaction type.

11. The method of claim 1 wherein the depicting further comprises setting visual display associations at runtime according to rules in a setting table.

12. The method of claim 1 wherein the depicting further comprises assigning a set of colors to at least one of paths and nodes representing contact interaction events according to whether each event leads to a particular target event type.

13. The method of claim 1 wherein the depicting further comprises associating contact sentiments with non-alphanumeric visual indicia on Sankey diagram events, the visual indicia comprising facial expressions selected from a group of predetermined facial expressions associated with contact sentiment values, with visual indicia sizes comprising one of a contact sentiment at each event and a contact sentiment recurrence at each event according to one of a time period and a particular event chain.

14. The method of claim 1 wherein the modifying further comprises selecting at least one particular path depicted in the Sankey diagram and responsively modifying a query for filtering input data according to the path selection.

15. The method of claim 1 wherein the modifying further comprises repeatedly customizing the Sankey diagram to progressively filter input data by iteratively modifying queries.

16. The method of claim 1 wherein the modifying further comprises modifying a threshold path quantity value with a graphical user interface device to select paths to be one of depicted and highlighted with a path color.

17. The method of claim 1 wherein the modifying further comprises modifying a context associated with at least one of a scenario, a data source, and a model.

18. The method of claim 1 wherein the modifying further comprises selecting at least one particular node and responsively expanding the selected node to depict associated child nodes in a variant selected node color.

19. The method of claim 1 wherein the modifying further comprises triggering a secondary display providing contextual statistical data describing at least one of gender, interest, age, sentiment, contact count, revenue, contact population members, and key persons of influence, using at least one of a pie chart, a word size speckle diagram, a bar chart, and a graph, in a secondary display area comprising one of a statistical bar, a pop-up menu, and a scrollable dialog box.

20. The method of claim 1 further comprising determining at least one of a business action and a business assessment in response to identifying one of a critical mass of data and a recurring pattern in data, the identifying based on event type occurrence frequencies.

21. The method of claim 20 further comprising correlating the business assessment with the business action according to the depicted information, wherein the business action is one of a past action, a current action, and a predictive action.

22. The method of claim 20 wherein the business action comprises performing a promotional event and wherein the business assessment comprises creating a target contact group.

23. A system comprising:
a processor that reads and executes instructions from a non-transitory machine-readable medium to:
selecting and depicting information in real time using an in-memory database and a Sankey diagram in a graphical user interface, the selecting and depicting comprising:
receiving user-generated interactions via the graphical user interface;
determining, for each user-generated interaction, a scenario associated with such interaction; and
querying, for each user-generated interaction, the in-memory database using a frequency mining algorithm associated with the corresponding determined scenario, the frequency mining algorithm determining a number of contacts that performed a same journey amongst various possible journeys displayed in the Sankey diagram, the querying being in the form of Structured Query Language (SQL) queries; and
modifying the depicted information according to a user customization of the Sankey diagram, the user customization comprising: user-generated input via the graphical user interface requesting a change in visualization data for a top journeys criteria;
wherein the requested change in visualization data is triggered by a resizing of a window on a device displaying the journey;
wherein the requested change in visualization data is triggered by a revised entry in a top journeys criteria;
wherein a top journeys calculation for an xth pattern is equal to $F(x): [(R(x)-1)/(N-1)]$, wherein x is a pattern number, $R(x)$ is a rank of pattern x, and N is a total number of patterns.

24. A non-transitory machine-readable medium storing instructions that, when executed, cause a processor to perform operations comprising:
selecting and depicting information in real time using an in-memory database and a Sankey diagram in a graphical user interface, the selecting and depicting comprising:
receiving user-generated interactions via the graphical user interface;
determining, for each user-generated interaction, a scenario associated with such interaction; and
querying, for each user-generated interaction, the in-memory database using a frequency mining algorithm associated with the corresponding determined scenario, the frequency mining algorithm determining a number of contacts that performed a same journey amongst various possible journeys displayed in the Sankey diagram, the querying being in the form of Structured Query Language (SQL) queries; and modifying the depicted information according to a user customization of the Sankey diagram, the user customization comprising: user-generated input via the graphical user interface requesting a change in visualization data for a top journeys criteria;

wherein the requested change in visualization data is triggered by a resizing of a window on a device displaying the journey;

wherein the requested change in visualization data is triggered by a revised entry in a top journeys criteria;

wherein a top journeys calculation for an xth pattern is equal to $F(x): [(R(x)-1)/(N-1)]$, wherein x is a pattern number, $R(x)$ is a rank of pattern x, and N is a total number of patterns.

* * * * *